(12) United States Patent
Mitsubayashi

(10) Patent No.: US 11,202,033 B2
(45) Date of Patent: Dec. 14, 2021

(54) IMAGE SENSOR AND TRANSMISSION SYSTEM WITH COLLISION DETECTION BASED ON STATE OF COLLISION DETECTION LINE

(71) Applicant: Sony Semiconductor Solutions Corporation, Kanagawa (JP)

(72) Inventor: Hideki Mitsubayashi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 93 days.

(21) Appl. No.: 16/490,332

(22) PCT Filed: Dec. 14, 2017

(86) PCT No.: PCT/JP2017/044958
§ 371 (c)(1),
(2) Date: Aug. 30, 2019

(87) PCT Pub. No.: WO2018/163554
PCT Pub. Date: Sep. 13, 2018

(65) Prior Publication Data
US 2020/0244922 A1    Jul. 30, 2020

(30) Foreign Application Priority Data

Mar. 8, 2017    (JP) .............................. JP2017-044021

(51) Int. Cl.
*H04N 7/08* (2006.01)
*H04N 5/225* (2006.01)
(Continued)

(52) U.S. Cl.
CPC ......... *H04N 7/0806* (2013.01); *G06F 13/376* (2013.01); *G06F 13/4068* (2013.01);
(Continued)

(58) Field of Classification Search
CPC .... H04N 7/0806; H04N 5/378; H04N 5/2258; H04N 5/247; H04N 5/38;
(Continued)

(56) References Cited

U.S. PATENT DOCUMENTS 5,761,480 A    6/1998 Fukada
2006/0256122 A1*  11/2006 Rai ........................ G09G 5/001
345/547

(Continued)

FOREIGN PATENT DOCUMENTS

CN    105432073 A    3/2016
CN    105518637 A    4/2016
(Continued)

OTHER PUBLICATIONS

Extended European Search Report dated Jan. 29, 2020 for corresponding European Application No. 17899294.7.
(Continued)

*Primary Examiner* — Twyler L Haskins
*Assistant Examiner* — Akshay Trehan
(74) *Attorney, Agent, or Firm* — Michael Best & Friedrich LLP

(57) ABSTRACT

Provided is an image sensor that is connected to a data bus to which another image sensor is connected and image data is transmitted, and a collision detection line to which the another image sensor is connected and which is pulled up to a voltage at a first level through a register. The image sensor determines, on a basis of a state of the collision detection line, whether a collision of pieces of the image data is to occur on the data bus when the image data is output, and then outputs the image data to the data bus.

16 Claims, 15 Drawing Sheets

(51) Int. Cl.
  *G06F 13/376* (2006.01)
  *H04N 5/378* (2011.01)
  *H04N 5/335* (2011.01)
  *H04N 5/247* (2006.01)
  *H04N 5/38* (2006.01)
  *H04L 29/08* (2006.01)
  *G06F 13/40* (2006.01)

(52) U.S. Cl.
  CPC .............. *H04L 29/08* (2013.01); *H04L 67/12* (2013.01); *H04N 5/2258* (2013.01); *H04N 5/247* (2013.01); *H04N 5/335* (2013.01); *H04N 5/378* (2013.01); *H04N 5/38* (2013.01)

(58) Field of Classification Search
  CPC . H04N 5/335–379; H04L 29/08; H04L 67/12; G06F 13/376; G06F 13/4068
  USPC .................................................. 348/294–324
  See application file for complete search history.

(56) References Cited

U.S. PATENT DOCUMENTS

| | | | | |
|---|---|---|---|---|
| 2007/0183672 | A1* | 8/2007 | Kotoda | A61B 1/0005 382/232 |
| 2014/0281753 | A1* | 9/2014 | Wagh | G06F 11/0745 714/56 |
| 2014/0300466 | A1 | 10/2014 | Park et al. | |
| 2015/0199287 | A1* | 7/2015 | Sengoku | G06F 13/4068 710/110 |
| 2016/0217090 | A1* | 7/2016 | Sengoku | G06F 13/26 |
| 2016/0345005 | A1 | 11/2016 | Hoekstra et al. | |

FOREIGN PATENT DOCUMENTS

| | | | | |
|---|---|---|---|---|
| JP | 07-334433 | A | | 12/1995 |
| JP | 2006-099288 | A * | 4/2006 | ............ G06F 13/00 |
| JP | 2006-099288 | A | | 4/2006 |
| JP | 2006099288 | A | | 4/2006 |
| JP | 2007-208781 | A | | 8/2007 |
| TW | 201130010 | A | | 9/2011 |
| WO | WO-2016103071 | A1 | | 6/2016 |

OTHER PUBLICATIONS

Culurciello E. et al., "Aloha CMOS Imager" 2004 IEEE International Symposium on Circuits and Systems, May 24, 2004, Vancouver, British Columbia, Canada, IEEE Operations Center Piscataway, NJ.

Chinese Office Action dated Jun. 29, 2021 for corresponding Chinese Application No. 20178008250.

* cited by examiner

FIG. 7
A
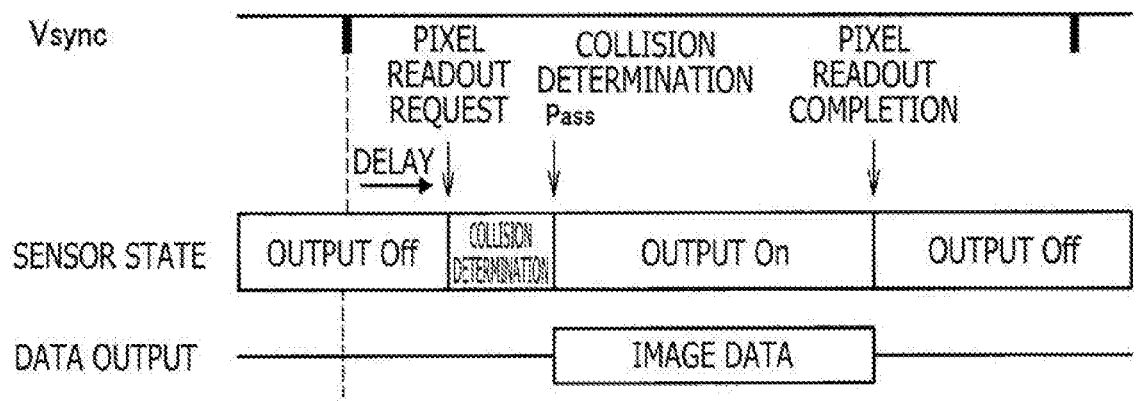
B
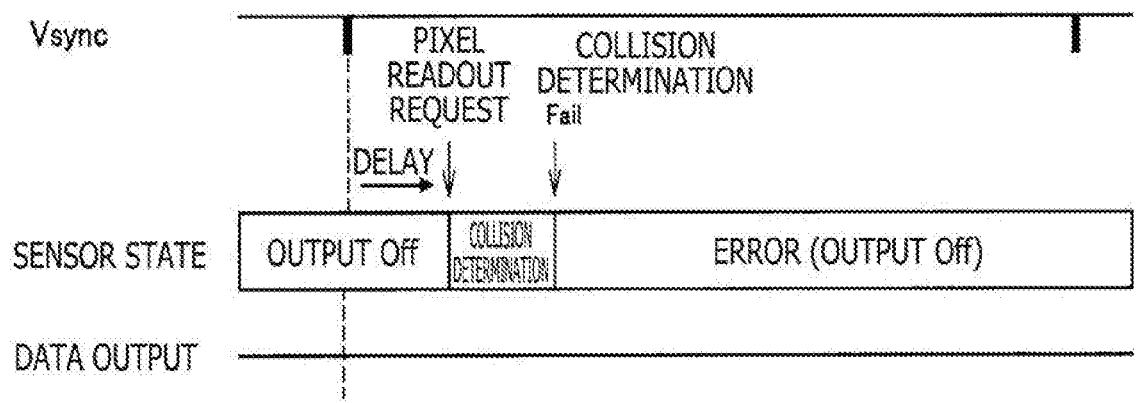

FIG.10

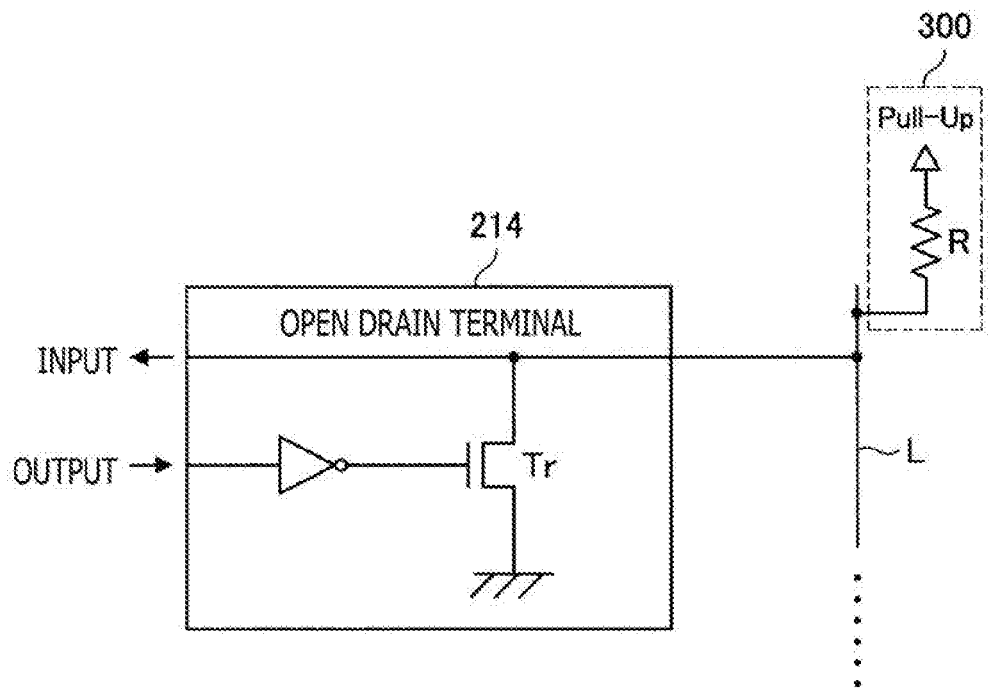

FIG.11

| STATE | COLLISION DETECTION OUTPUT OF SENSOR IN QUESTION | COLLISION DETECTION LINE STATE | COLLISION DETECTION OUTPUT STATES OF ALL SENSORS |
|---|---|---|---|
| STATE 1 | 1 | 1 | COLLISION DETECTION OUTPUTS OF ALL SENSORS ARE 1 |
| STATE 2 | 1 | 0 | COLLISION DETECTION OUTPUTS OF SENSORS OTHER THAN SENSOR IN QUESTION ARE 0 |
| STATE 3 | 0 | 0 | COLLISION DETECTION OUTPUT OF AT LEAST ONE SENSOR INCLUDING SENSOR IN QUESTION IS 0 |

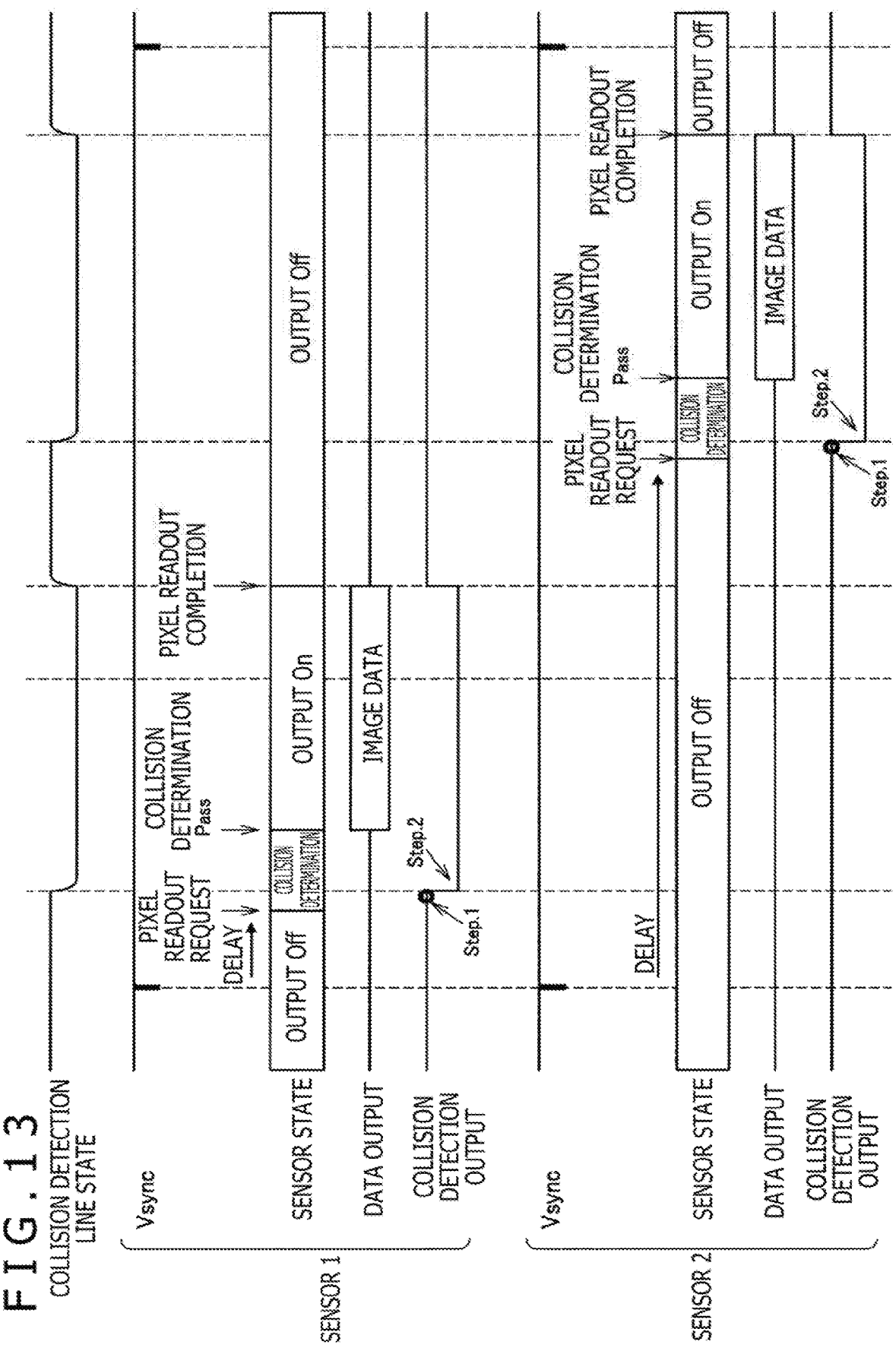

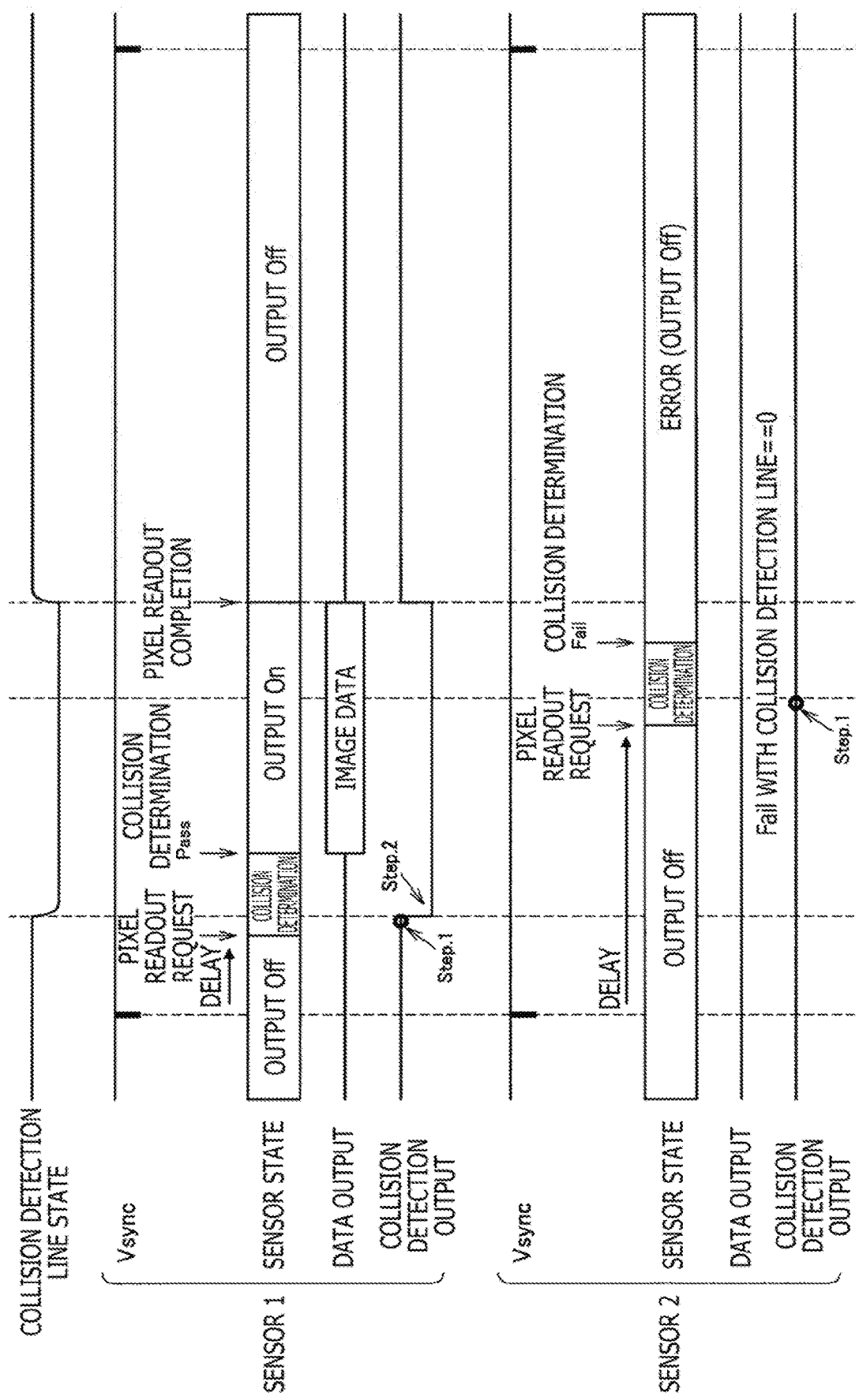

| | | | | | | |
|---|---|---|---|---|---|---|
| COLLISION DETECTION OUTPUT OF SENSOR 1 | 1 | 1 | 1 | 1 | 1 | |
| COLLISION DETECTION OUTPUT OF SENSOR 2 | 1 | 1 | 0 | 0 | 1 | |
| COLLISION DETECTION OUTPUT OF SENSOR 3 | 0 | 0 | 1 | 1 | 1 | |
| COLLISION DETECTION OUTPUT OF SENSOR 4 | 0 | 0 | 0 | 0 | 1 | |

B

| | | | | | | | | |
|---|---|---|---|---|---|---|---|---|
| COLLISION DETECTION OUTPUT OF SENSOR 1 | 1 | 1 | 1 | 1 | 1 | 1 | 1 | |
| COLLISION DETECTION OUTPUT OF SENSOR 2 | 1 | 1 | 1 | 1 | 0 | 0 | 1 | |
| COLLISION DETECTION OUTPUT OF SENSOR 3 | 1 | 1 | 0 | 0 | 1 | 1 | 1 | |
| COLLISION DETECTION OUTPUT OF SENSOR 4 | 1 | 1 | 0 | 0 | 0 | 0 | 1 | |
| COLLISION DETECTION OUTPUT OF SENSOR 5 | 0 | 0 | 1 | 1 | 1 | 1 | 1 | |
| COLLISION DETECTION OUTPUT OF SENSOR 6 | 0 | 0 | 1 | 1 | 0 | 0 | 1 | |
| COLLISION DETECTION OUTPUT OF SENSOR 7 | 0 | 0 | 0 | 0 | 1 | 1 | 1 | |
| COLLISION DETECTION OUTPUT OF SENSOR 8 | 0 | 0 | 0 | 0 | 0 | 0 | 1 | |

IMAGE SENSOR AND TRANSMISSION SYSTEM WITH COLLISION DETECTION BASED ON STATE OF COLLISION DETECTION LINE

TECHNICAL FIELD

The present disclosure relates to an image sensor and a transmission system.

BACKGROUND ART

There have been developed techniques related to connection between devices, for example, connection between a processor and a sensor. As the technique related to connection between devices, a technique described in PTL 1 below is given, for example.

CITATION LIST

Patent Literature

[PTL 1]

SUMMARY

Technical Problems

More and more pieces of electronic equipment are sophisticated and given multiple functions, for example, and some pieces of electronic equipment including a processing apparatus such as a processor include a plurality of image sensors. Further, with regard to the electronic equipment including the processing apparatus as described above, it is desired that the number of data buses to be connected to the processing apparatus be reduced. When the number of data buses to be connected to the processing apparatus is reduced, for example, the following effects can be achieved.

A wiring region that connects a processing apparatus and a plurality of image sensors to each other is reduced hardware configuration of a processing apparatus is simplified Here, as a standard for connecting a processor (an example of a processing apparatus; the same applies hereinafter) and an image sensor to each other by a data bus (an example of a signal transmission path), there is the CSI-2 (Camera Serial Interface 2) standard of the MIPI (Mobile Industry Processor Interface) Alliance. The CSI-2 standard is a standard for connecting a processor and an image sensor to each other on a one-to-one basis by a data bus. Existing standards including the CSI-2 standard do not take "connecting a processor and a plurality of image sensors to each other on a data bus" into consideration. Thus, in a case where a processor and each of a plurality of image sensors are connected to each other by a data bus by simply utilizing an existing standard such as the CSI-2 standard, as many data buses as the image sensors are required to be connected to the processor. Thus, in the case where an existing standard such as the CSI-2 standard is simply utilized, it is difficult to reduce the above-mentioned wiring region and the above-mentioned number of data buses to be connected to the processor.

Further, as the method for reducing the number of data buses to be connected to a processing apparatus, a method in which a data bus is shared by a plurality of image sensors is conceivable. Further, in the case where a data bus is shared by a plurality of image sensors, a collision prevention measure for preventing "a collision of pieces of image data that are output to a data bus by a plurality of image sensors on the data bus" is required.

Here, as the above-mentioned collision prevention measure, setting a unique amount of delay to each of a plurality of image sensors is conceivable. With a plurality of image sensors to each of which a unique amount of delay is set, the image sensors can output image data at different timings, and hence it is possible to prevent pieces of image data that the image sensors output to a data bus from colliding with each other on the data bus.

In the case where a unique amount of delay is set to each of a plurality of image sensors, however, when an inappropriate amount of delay is set due to a setting error of an amount of delay, for example, the image sensors may undesirably output image data at overlapped timings. This means that, even when a unique amount of delay is set to each of a plurality of image sensors, "a collision of pieces of image data that are output to a data bus by a plurality of image sensors on the data bus" cannot always be prevented.

The present disclosure proposes a novel and enhanced image sensor and transmission system capable of preventing an occurrence of an image data collision on a data bus shared by a plurality of image sensors.

Solution to Problems

According to the present disclosure, there is provided an image sensor that is connected to a data bus to which another image sensor is connected and image data is transmitted, and to a collision detection line to which the another image sensor is connected and which is pulled up to a voltage at a first level through a register, the image sensor determining, on the basis of a state of the collision detection line, whether a collision of pieces of the image data is to occur on the data bus when the image data is output, and then outputting the image data to the data bus.

Further, according to the present disclosure, there is provided a transmission system including: a plurality of image sensors each of which is connected to a data bus to which image data is transmitted, and a collision detection line that is pulled up to a voltage at a first level through a register; a processing apparatus that is connected to the data bus; and a pull-up circuit that includes the register pulling up the collision detection line to the voltage at the first level, in which each of the plurality of image sensors determines, on the basis of a state of the collision detection line, whether a collision of pieces of the image data is to occur on the data bus when the image data is output, and then outputs the image data to the data bus.

Advantageous Effect of Invention

According to the present disclosure, an occurrence of an image data collision on the data bus shared by the plurality of image sensors can be prevented.

Note that the above-mentioned effect is not necessarily limited, and any effect described herein or other effects that may be grasped from the present specification may be provided in addition to the above-mentioned effect or instead of the above-mentioned effect.

BRIEF DESCRIPTION OF DRAWINGS

FIG. 7 is an explanatory diagram illustrating an example of an operation of the sensor of the transmission system illustrated in FIG. 5.

FIG. 10 is an explanatory diagram illustrating an example of a configuration of a collision detection circuit included in the sensor (image sensor) according to the present embodiment.

FIG. 11 is an explanatory diagram illustrating an example of a state of a collision detection line L in the transmission system according to the present embodiment.

FIG. 13 is an explanatory diagram illustrating an example of image data transmission in the transmission system according to the present embodiment.

FIG. 14 is an explanatory diagram illustrating an example of image data transmission in the transmission system according to the present embodiment.

FIG. 15 is an explanatory diagram illustrating an example of a collision detection pattern according to the present embodiment.

DESCRIPTION OF EMBODIMENT

A preferred embodiment of the present disclosure is described in detail below with reference to the attached drawings. Note that, in the present specification and the drawings, components having substantially the same functional configuration are denoted by the same reference symbols and redundant description is omitted.

The following items are now described in order.

1. Transmission System According to Present Embodiment

2. Program According to Present Embodiment (Transmission System According to Present Embodiment)

[1] Transmission System in Which Data Bus is Shared

Prior to description of a configuration of a transmission system according to the present embodiment, a transmission system in which a data bus is shared is described.

Figure 1:
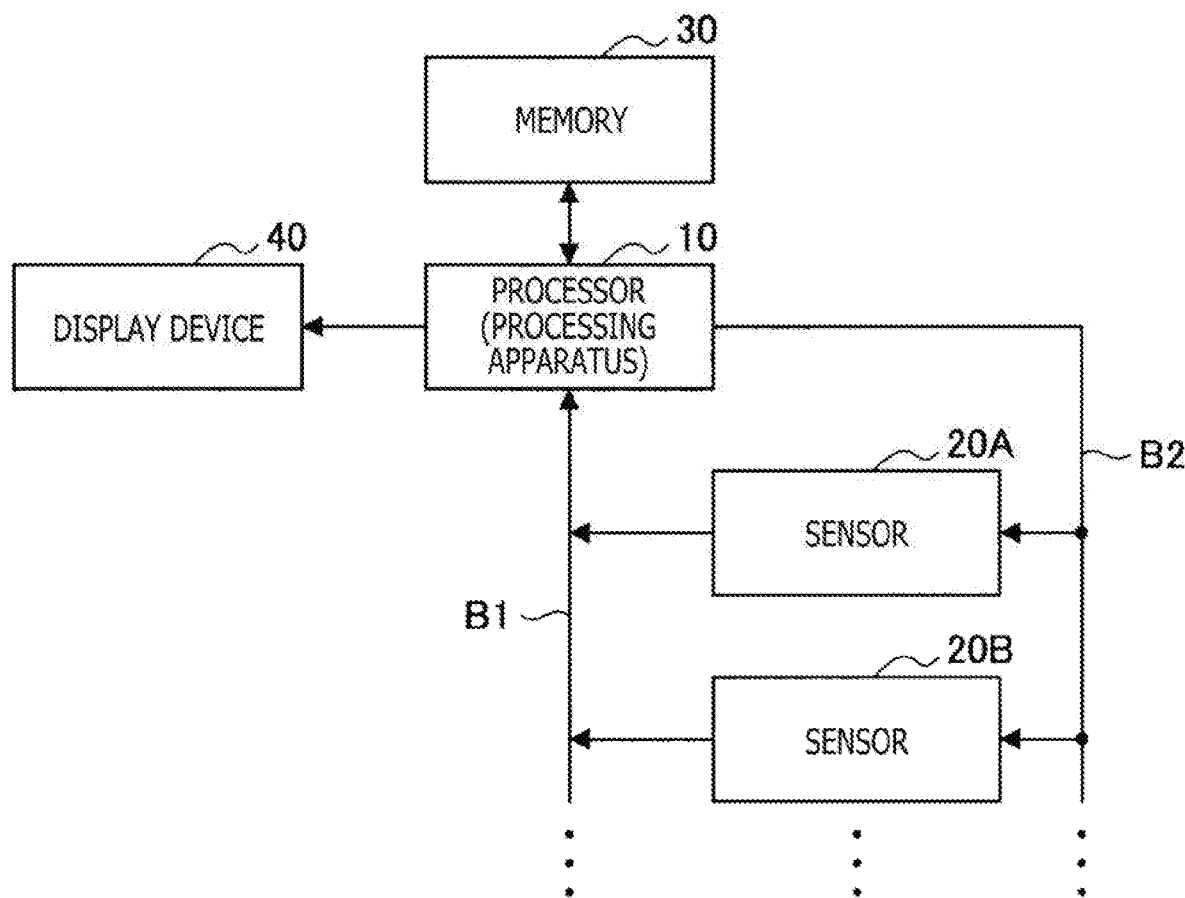
FIG. 1 is an explanatory diagram illustrating an example of a configuration of a transmission system in which a data bus is shared.

FIG. 1 is an explanatory diagram illustrating an example of a configuration of a transmission system 50 in which a data bus is shared. The transmission system 50 includes, for example, a processor 10 (processing apparatus), a plurality of sensors 20A and 20B and other sensors (image sensors) each having a function of outputting images, a memory 30, and a display device 40. In the following description, the plurality of sensors 20A and 20B and other sensors are collectively referred to as a "sensor 20" or one of the plurality of sensors 20A and 20B and other sensors is referred to as the "sensor 20" as a representative in some cases.

Note that the number of sensors included in the transmission system 50 is not limited to three or more, and the transmission system 50 may have a configuration including two image sensors.

The processor 10 and each of the plurality of sensors 20 are electrically connected to each other by one data bus B1. In short, in the transmission system 50, the data bus B1 is shared by the plurality of sensors 20. The data bus B1 is one signal transmission path that connects the processor 10 and each of the sensors 20 to each other. For example, data indicating an image that is output from each of the sensors 20 (hereinafter sometimes referred to as "image data") is transmitted from the sensor 20 to the processor 10 through the data bus B1.

A signal that is transmitted by the data bus B1 in the transmission system 50 is transmitted with, for example, any standard such as the CSI-2 standard or PCI Express in which the start and end of data that is transmitted is specified by predetermined data. Examples of the above-mentioned predetermined data include frame start packets in the CSI-2 standard and frame end packets in the CSI-2 standard.

Further, the processor 10 and each of the plurality of sensors 20 are electrically connected to each other by a control bus B2, which is different from the data bus B1. The control bus B2 is another signal transmission path that connects the processor 100 and each of the sensors 200 to each other. For example, control information (described later) that is output from the processor 10 is transmitted from the processor 10 to the sensors 20 through the control bus B2. Note that, in the example illustrated in FIG. 1, the processor 10 and each of the plurality of sensors 20 are connected to each other by one control bus B2, but in the transmission system 50, the plurality of sensors 20 may be connected to the processor 10 by control buses different from each other. Further, the processor 10 and each of the plurality of sensors 20 are not limited to configurations that transmit and receive control information (described later) to and from each other through the control bus B2, and may take configurations that transmit and receive control information (described later) to and from each other through wireless communication of any communication system capable of supporting transmission and reception of control information, for example.

[1-1] Processor 10

The processor 10 includes one or two or more processors each including a computation circuit such as an MPU (Micro Processing Unit), various processing circuits, and other components. The processor 10 is driven with electric power that is supplied from an internal power supply (not illustrated) of the transmission system 50, such as a battery, or electric power that is supplied from a power supply external to the transmission system 50.

The processor 10 transmits control information to each of the sensors 20 through, for example, the control bus B2.

The control information includes, for example, identification information indicating the sensors 20 and processing requests.

Examples of the identification information indicating the sensors 20 include any data capable of specifying the sensors 20, such as IDs set to the respective sensors 20. The control information includes the identification information, so that the sensor 20 that has acquired control information through the control bus B2 can specify whether or not the acquired control information is control information that has been transmitted to the sensor 20 itself. Note that, for example, in a case where the transmission system 50 has a configuration including different control buses for the respective sensors 20, the control information may not include the identification information.

The processing request is data indicating an instruction for controlling the operation of the sensors 20. Examples of the processing request include a setting request for making setting for defining the operation of the sensors 20, a start request for causing the sensors 20 to start imaging operation, and a stop request for causing the sensors to stop the imaging operation.

Note that the data included in the control information is not limited to the above-mentioned examples.

The control information may include, for example, setting information indicating setting for defining the operation of the sensors 20. Examples of the setting indicated by the setting information include setting of an amount of delay related to output of image data to the data bus B1, setting for defining whether or not to output a frame start packet, setting for defining whether or not to output a frame end packet, setting for defining an image size, and setting for defining a frame rate.

For example, the control information including the setting information is sent from the processor 10 to the sensors 20 through the control bus B2 so that the sensors 20 perform operation corresponding to setting indicated by the setting information.

[1-2] Sensor 20

The sensor 20 is an image sensor. Examples of the sensor 20 include any sensor devices such as imaging devices including digital still cameras, digital video cameras, and stereo cameras, infrared sensors, and distance image sensors. The sensor 20 has a function of outputting generated images. Here, an image that is generated by the sensor 20 corresponds to data indicating a result of sensing by the sensor 20.

The sensor 20 performs operation corresponding to setting indicated by the setting information on the basis of the setting information stored in a recoding medium such as a register of the sensor 20.

The sensor 20 takes generation timings of a synchronization signal Vsync on the basis of an image size indicated by the setting information, for example. In the transmission system 50, each of the sensors 20 performs the imaging operation with the generated synchronization signal Vsync being a trigger, so that the plurality of sensors 20 performs imaging in synchronization with each other.

Further, for example, the sensor 20 performs, on the basis of an amount of delay indicated by the setting information, the imaging operation after a period of time corresponding to the amount of delay has elapsed since the generation of the synchronization signal Vsync. Thus, in the transmission system 50, each of the sensors 20 delays the imaging operation on the basis of an amount of delay indicated by the setting information, so that the sensors 20 can output image data at different timings.

Figure 2:
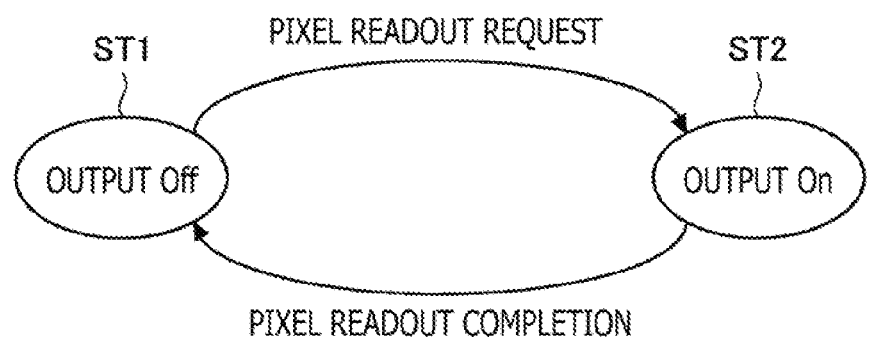
FIG. 2 is an explanatory diagram illustrating a state transition of a sensor of the transmission system illustrated in FIG. 1.

FIG. 2 is an explanatory diagram illustrating a state transition of the sensor 20 of the transmission system 50 illustrated in FIG. 1. The state of the sensor 20 includes State ST1 in which image data is not output and State ST2 in which image data is output.

In the following description, a state in which sensors (the sensors 20 and sensors according to the present embodiment described later) are in State ST1 in which image data is not output is sometimes referred to as "output Off." Further, in the following description, a state in which the sensors (the sensors 20 and the sensors according to the present embodiment described later) are in State ST2 in which image data is output is sometimes referred to as "output On."

The sensor 20 transitions from State ST1 in which image data is not output to State ST2 in which image data is output, for example, when a pixel readout request is sent to a pixel array (described later) including imaging elements after a period of time corresponding to an amount of delay indicated by the setting information has elapsed since the generation of the synchronization signal Vsync.

Further, the sensor 20 transitions from State ST2 in which image data is output to State ST1 in which image data is not output, for example, when readout of all of pixels of the pixel array (described later) is completed.

[1-3] Memory 30

The memory 30 is a recoding medium that the transmission system 50 includes. Examples of the memory 30 include a volatile memory such as a RAM (Random Access Memory) and a non-volatile memory such as a flash memory.

The memory 30 stores, for example, image data output from each of the sensors 20. Images are recorded on the memory 30 through control by the processor 10, for example.

[1-4] Display Device 40

The display device 40 is a display device that the transmission system 50 includes. Examples of the display device 40 include a liquid crystal display and an organic EL display (also called an Organic Electro-Luminescence Display or an OLED display (Organic Light Emitting Diode Display)).

On a display screen of the display device 40, for example, there are displayed various images and screens such as images indicated by image data output from each of the sensors 20, screens of applications that are executed by the processor 10, and screens of an UI (User Interface). The images and the like are displayed on the display screen of the display device 40 through control by the processor 10, for example.

[1-5] Example of Image Data Transmission in Transmission System 50

In the transmission system 50, as described above, each of the sensors 20 outputs image data to the data bus B1 on the basis of an amount of delay indicated by the setting information.

Figure 3:
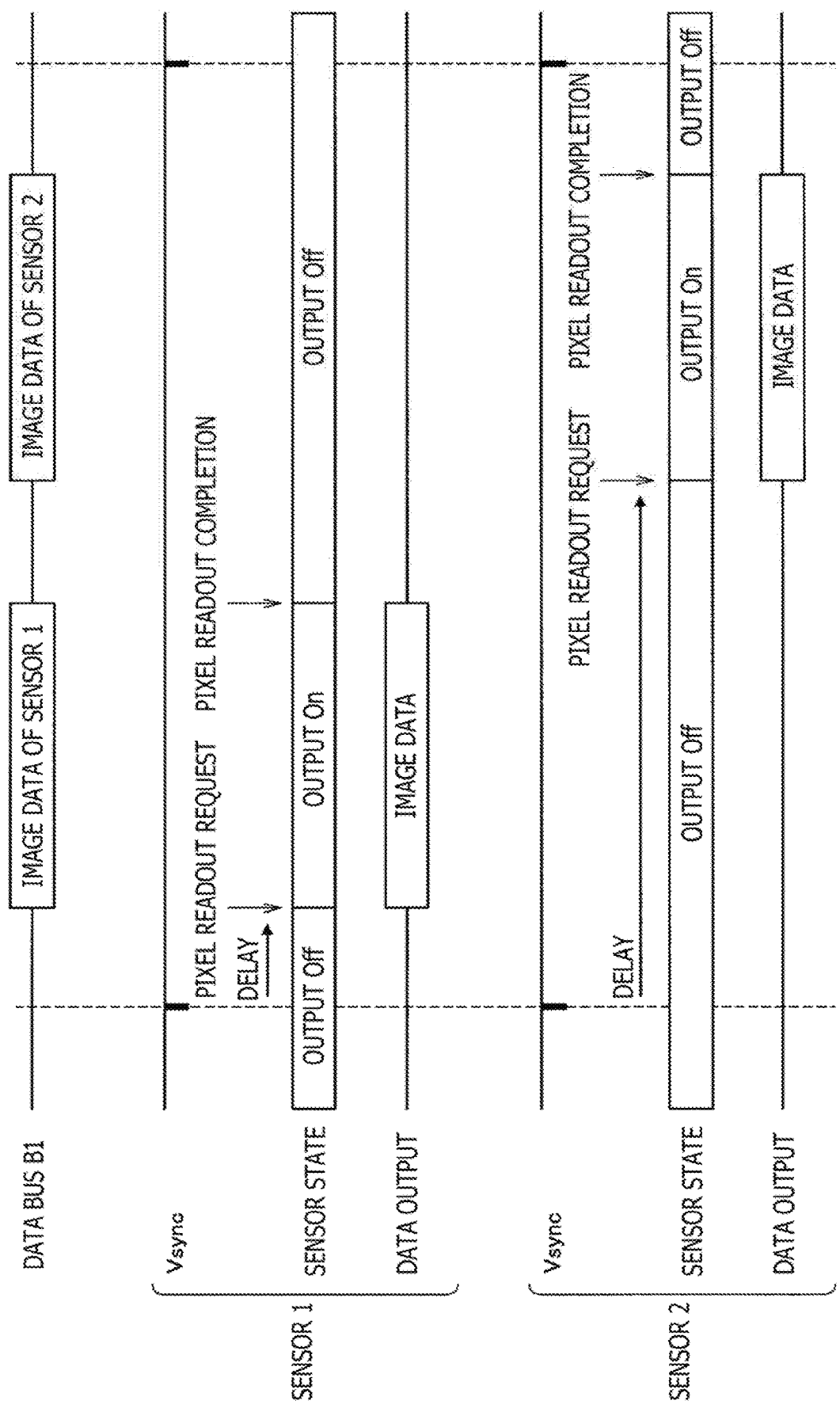
FIG. 3 is an explanatory diagram illustrating an example of image data transmission in the transmission system.

FIG. 3 is an explanatory diagram illustrating an example of image data transmission in the transmission system 50. FIG. 3 illustrates an example of image data transmission in a case where the transmission system 50 includes two image sensors represented by a sensor 1 and a sensor 2.

"Vsync" in FIG. 3 represents a synchronization signal (the same holds true in other figures). Further, "SENSOR STATE" in FIG. 3 represents a state of an image sensor (the same holds true in other figures). Further, "DATA OUTPUT" in FIG. 3 represents output of image data to the data bus B1 (the same holds true in other figures).

As indicated by "DELAY" in FIG. 3, each of the sensor 20 represented by the sensor 1 and the sensor 20 represented by the sensor 2 transitions from State ST1 in which image data is not output to State ST2 in which image data is output after a period of time corresponding to an amount of delay indicated by the setting information has elapsed. Thus, as illustrated in FIG. 3, in the transmission system 50, the sensors 20 can output image data to the data bus B1 at timings not overlapped with each other.

In the case where the timing at which each of the sensors 20 outputs image data is controlled only with an amount of delay indicated by the setting information as in the transmission system 50, however, when a setting error of an amount of delay occurs due to a bug in software (computer program) that the processor 10 executes, for example, the plurality of sensors 20 may undesirably output image data at overlapped timings.

Figure 4:
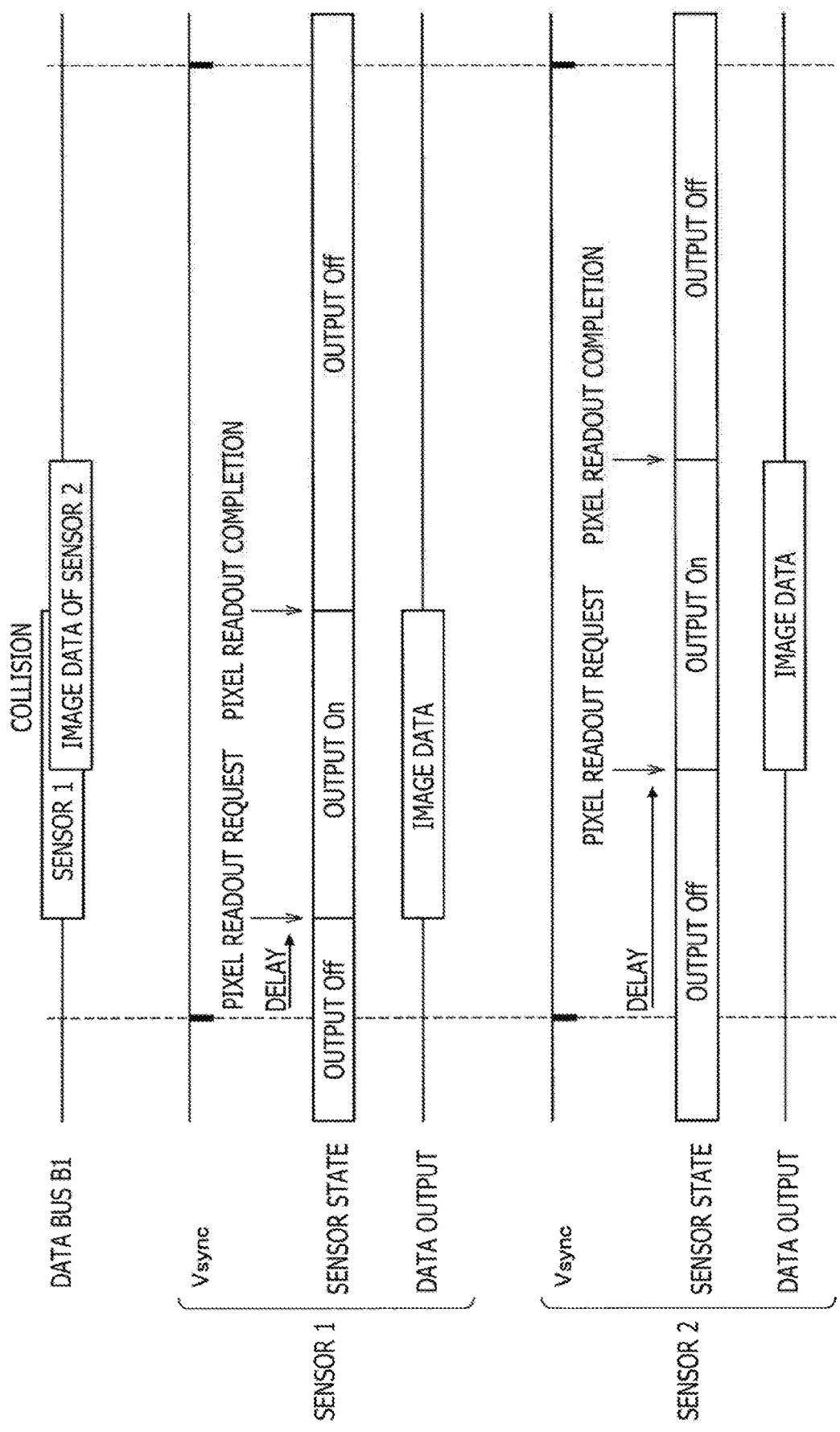
FIG. 4 is an explanatory diagram illustrating another example of image data transmission in the transmission system.

FIG. 4 is an explanatory diagram illustrating another example of image data transmission in the transmission system 50. FIG. 4 illustrates an example of image data transmission in a case where the plurality of sensors 20 outputs image data at overlapped timings. FIG. 4 illustrates, like FIG. 3, an example of image data transmission in the case where the transmission system 50 includes the two image sensors represented by the sensor 1 and the sensor 2.

As illustrated in FIG. 4, in the case where the plurality of sensors 20 outputs image data at overlapped timings, an image data collision occurs on the data bus B1. Further, the image data collision occurred on the data bus B1 may result in the following undesirable situations, for example.

Image data is damaged

The sensor 20 is physically damaged due to an electrical short circuit

Thus, even when the timing at which each of the sensors 20 outputs image data is controlled only with an amount of delay indicated by the setting information as in the transmission system 50, "a collision of pieces of image data that are output to the data bus B1 by the plurality of sensors 20 on the data bus B1" cannot always be prevented.

[2] Configuration of Transmission System According to Present Embodiment and Collision Prevention Method in Transmission System According to Present Embodiment In view of this, in the transmission system according to the present embodiment, "each of image sensors determines whether or not an image data collision is to occur on a data bus when image data is output, and then outputs the image data to the data bus," so that an occurrence of an image data collision on the data bus is prevented. In the following description, "determining whether an image data collision is to occur on a data bus when image data is output" is sometimes referred to as "collision determination."

Similar to the transmission system 50 illustrated in FIG. 1, the transmission system according to the present embodiment is a system including a processor (an example of a processing apparatus according to the present embodiment; the same applies hereinafter) and a plurality of image sensors, in which a data bus is shared by the plurality of image sensors. Examples of the transmission system according to the present embodiment include various pieces of electronic equipment including a communication apparatus such as a smartphone, a moving body such as a drone (equipment that can be operated by remote control or can autonomously operate) and a vehicle, a computer such as PC (Personal Computer), a tablet apparatus, and a game console. Note that, needless to say, the application example of the transmission system according to the present embodiment is not limited to the above-mentioned examples.

Figure 5:
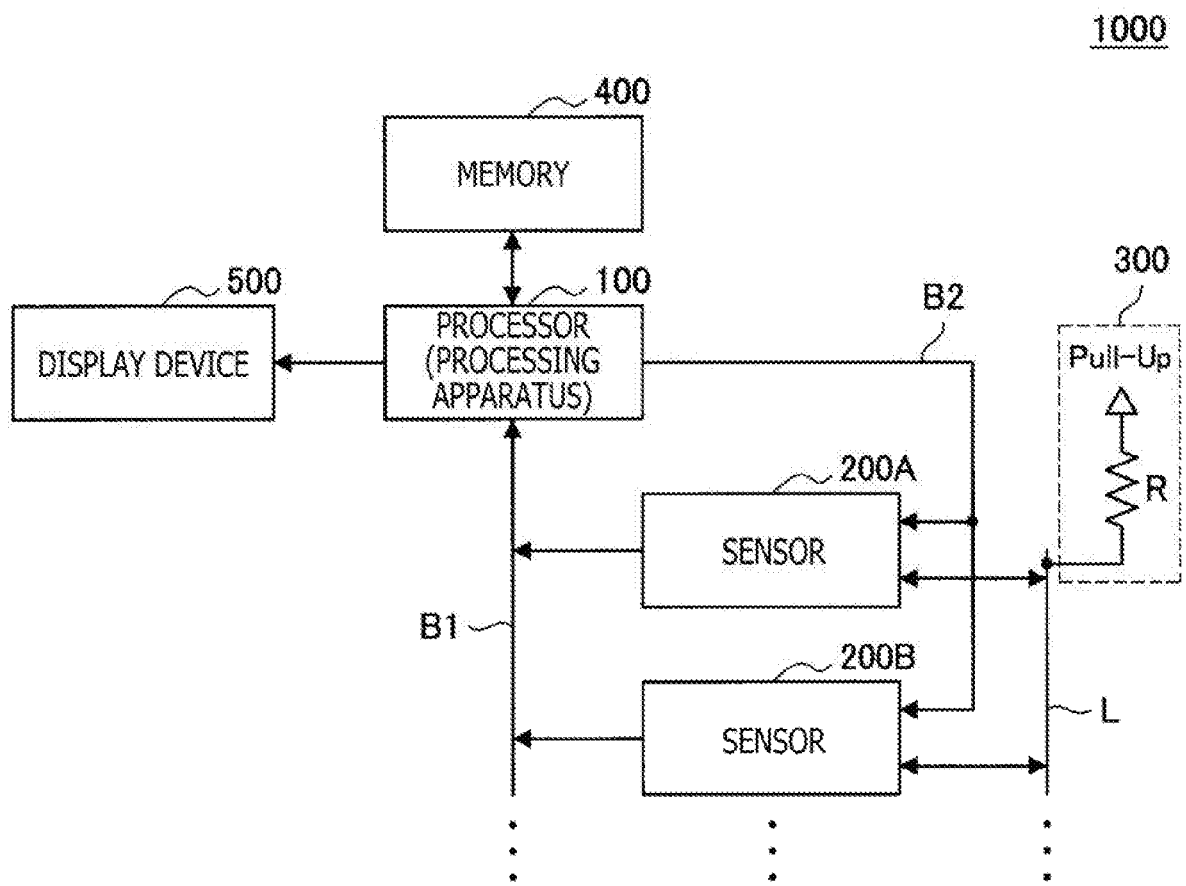
FIG. 5 is an explanatory diagram illustrating an example of a configuration of a transmission system according to the present embodiment.

FIG. 5 is an explanatory diagram illustrating an example of the configuration of a transmission system 1000 according to the present embodiment.

The transmission system 1000 according to a first configuration example includes, for example, a processor 100 (the processing apparatus according to the present embodiment), a plurality of sensors 200A and 200B and other sensors (image sensors according to the present embodiment), a pull-up circuit 300, a memory 400, and a display device 500. In the following description, the plurality of sensors 200A and 200B and other sensors are collectively referred to as a "sensor 200" or one of the plurality of sensors 200A and 200B and other sensors is referred to as the "sensor 200" as a representative in some cases.

Note that the transmission system 1000 illustrated in FIG. 5 includes three or more sensors 200, but the number of the sensors 200 that the transmission system according to the present embodiment includes is not limited to the example illustrated in FIG. 5. For example, the transmission system according to the present embodiment may have a configuration including two sensors 200.

The processor 100 and each of the plurality of sensors 200 are electrically connected to each other by one data bus B1 as in the transmission system 50 illustrated in FIG. 1. In short, in the transmission system 1000, the data bus B1 is shared by the plurality of sensors 200 as in the transmission system 50 illustrated in FIG. 1. For example, image data that is output from each of the sensors 200 is transmitted from the sensor 200 to the processor 100 through the data bus B1.

Further, the processor 100 and each of the plurality of sensors 200 are electrically connected to each other by the control bus B2 as in the transmission system 50 illustrated in FIG. 1. For example, control information that is output from the processor 100 is transmitted from the processor 100 to the sensors 200 through the control bus B2. Note that FIG. 5 illustrates an example in which the processor 100 and each of the plurality of sensors 200 are connected to each other by one control bus B2, but in the transmission system 1000, the plurality of sensors 200 may be connected to the processor 100 by control buses different from each other. Further, the processor 100 and each of the plurality of sensors 200 are not limited to the configurations that transmit and receive control information to and from each other through the control bus B2, and may take configurations that transmit and receive control information to and from each other through wireless communication of any communication system capable of supporting transmission and reception of control information, for example.

Further, each of the plurality of sensors 200 is connected to a collision detection line L. More specifically, the collision detection line L is electrically connected to an open drain circuit (described later) included in the sensor 200.

The collision detection line L is pulled up to a voltage at a first level by the pull-up circuit 300. The voltage at the first level according to the present embodiment is a voltage at a high level (a voltage equal to or larger than a first threshold that is set in the transmission system 1000 or a voltage larger than the first threshold).

Each of the plurality of sensors 200 detects a state of the collision detection line L through the open drain circuit (described later). Then, the plurality of sensors 200 determines, on the basis of the state of the collision detection line L, whether an image data collision is to occur on the data bus B1 when image data is output.

Here, the state of the collision detection line L takes the wired-AND logic of a voltage level of a voltage that each of the plurality of sensors 200 outputs to the collision detection line L through the open drain circuit (described later). In other words, the state of the collision detection line L indicates a value "1" corresponding to the first level in a case where all of the sensors 200 are outputting the voltage at the first level, and indicates a value "0" corresponding to a second level in a case where at least one of the plurality of sensors 200 is outputting a voltage at the second level.

When image data is output, each of the plurality of sensors 200 outputs the voltage at the second level to the collision detection line L through the open drain circuit (described later). The voltage at the second level according to the present embodiment is a voltage at a low level that is smaller than the voltage at the first level (a voltage equal to or smaller than a second threshold that is set in the transmission system 1000 or a voltage smaller than the second threshold (the second threshold is a value equal to or smaller than the first threshold)).

That is, in the transmission system 1000, in a case where any one of the plurality of sensors 200 is outputting image data to the data bus B1, the state of the collision detection line L indicates the value "0" corresponding to the second level.

Thus, the plurality of sensors 200 can uniquely specify, with the use of the state of the collision detection line L, whether any of the sensors 200 of the transmission system 1000 is outputting image data to the data bus B1 or none of the sensors 200 is outputting image data to the data bus B1.

Here, if one sensor 200 outputs image data when it is specified that any of the sensors 200 of the transmission system 1000 is outputting image data to the data bus B1, an image data collision occurs on the data bus B1. This means that the plurality of sensors 200 can determine, with the use of the state of the collision detection line L, whether or not an image data collision is to occur on the data bus B1 when image data is output.

In the transmission system 1000, before outputting image data, each of the plurality of sensors 200 performs collision determination on the basis of the state of the collision detection line L. Then, each of the plurality of sensors 200 outputs image data to the data bus B1 in a case in which it is determined that a collision is not to occur, and does not output image data in a case in which it is determined that a collision is to occur.

As a consequence, in the transmission system 1000 in which the data bus B1 is shared by the plurality of sensors 200, an occurrence of an image data collision on the data bus B1 can be prevented.

Now, with description of an example of the configuration of the transmission system 1000, the collision prevention method in the transmission system 1000 is more specifically described.

[2-1] Processor 100 (Processing Apparatus According to Present Embodiment), Memory 400, and Display Device 500

The processor 100, the memory 400, and the display device 500 have similar functions and configurations as those of the processor 10, the memory 30, and the display device 40 of the transmission system 50 illustrated in FIG. 1.

[2-2] Pull-Up Circuit 300

The pull-up circuit 300 is a circuit including a register R (pull-up register) configured to pull up the collision detection line L to the voltage at the first level. One end of the register R of the pull-up circuit 300 is connected to a power supply, and the other end of the register R is connected to the collision detection line L. Here, the above-mentioned power supply may be a power supply included in the pull-up circuit 300 or a power supply external to the pull-up circuit 300.

Note that a configuration of the pull-up circuit 300 is not limited to the example illustrated in FIG. 5. For example, the pull-up circuit 300 may be a circuit having any configuration capable of pulling up the collision detection line L to the voltage at the first level.

[2-3] Sensor 200 (Image Sensor according to Present Embodiment)

[2-3-1] Outline of Sensor 200

First, an outline of the sensor 200 is described.

The sensor 200 is an image sensor. Similar to the above-mentioned sensor 20 of the transmission system 50 illustrated in FIG. 1, examples of the sensor 200 include any sensor devices such as imaging devices including digital still cameras, digital video cameras, and stereo cameras, infrared sensors, and distance image sensors. The sensor 200 has a function of outputting generated images. Here, an image that is generated by the sensor 200 corresponds to data indicating a result of sensing by the sensor 200.

Further, the sensor 200 basically has functions similar to those of the sensor 20 of the transmission system 50 illustrated in FIG. 1. Specifically, for example, the sensor 200 performs, like the sensor 20, operation corresponding to setting indicated by the setting information on the basis of the setting information stored in a recoding medium such as the register of the sensor 200.

Figure 6:
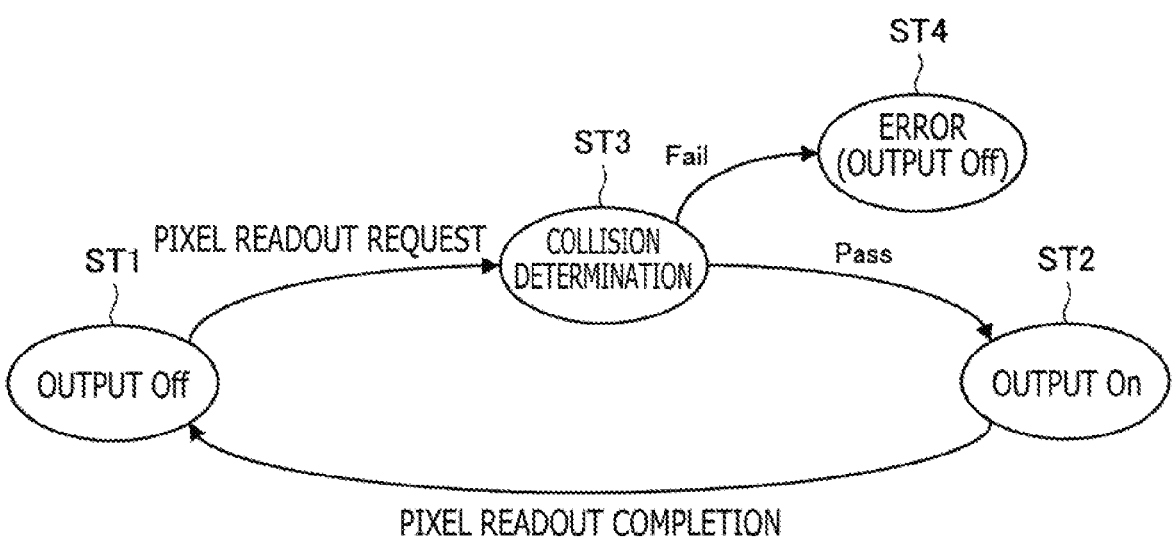
FIG. 6 is an explanatory diagram illustrating a state transition of a sensor of the transmission system illustrated in FIG. 5.

FIG. 6 is an explanatory diagram illustrating a state transition of the sensor 200 of the transmission system 1000 illustrated in FIG. 5. The state of the sensor 200 includes State ST1 in which image data is not output, State ST2 in which image data is output, State ST3 in which collision determination is performed, and Error State ST4.

When the state transition of the sensor 200 illustrated in FIG. 6 and the state transition of the sensor 20 illustrated in FIG. 2 are compared with each other, the sensor 200 may enter one of two states that the sensor 20 does not have, namely, State ST3 in which collision determination is performed and Error State ST4.

In State ST3 in which collision determination is performed, as described above, collision determination is performed on the basis of the state of the collision detection line L. As systems of collision determination according to the present embodiment, for example, a first collision detection system described later and a second collision detection system described later are given. In the following description, the first collision detection system is sometimes referred to as a "system 1" and the second collision detection system is sometimes referred to as a "system 2." Further, in the following description, a state in which the sensor 200 is in State ST3 in which collision determination is performed is sometimes referred to as "collision determination" (the same holds true also in other figures).

Error State ST4 is a state that the sensor 200 enters in a case where it is determined that a collision is to occur in collision determination. The sensor 200 in Error State ST4 does not output image data to the data bus B1.

The sensor 200 in Error State ST4 does not output image data, so that an occurrence of an image data collision on the data bus B1 is prevented in the transmission system 1000. That is, the sensor 200 in Error State ST4 does not output image data, so that a fail-safe is achieved in the transmission system 1000.

The sensor 200 in Error State ST4 does not output image data, so that the processor 100 can detect that some errors are occurring in image data transmission.

The sensor 200 transitions from State ST1 in which image data is not output to State ST3 in which collision determination is performed "after a period of time corresponding to an amount of delay indicated by the setting information has elapsed since the generation of the synchronization signal Vsync, and before a pixel readout request is sent to the pixel array (described later) including the imaging elements," for example.

Further, the sensor 200 transitions from State ST3 in which collision determination is performed to State ST2 in which image data is output in a case where it is not determined that a collision is to occur in collision determination, for example.

Further, the sensor 200 transitions from State ST3 in which collision determination is performed to Error State ST4 in the case where it is determined that a collision is to occur in collision determination, for example.

Further, the sensor 200 transitions from State ST2 in which image data is output to State ST1 in which image data is not output when readout of all of the pixels of the pixel array (described later) is completed similarly to the sensor 20 illustrated in FIG. 5.

As illustrated in FIG. 6, on the basis of a result of collision determination, it is determined whether the sensor 200 is to transition from State ST3 in which collision determination is performed to State ST2 in which image data is output or is to transition from State ST3 in which collision determination is performed to Error State ST4.

FIG. 7 is an explanatory diagram illustrating an example of the operation of the sensor 200 of the transmission system 1000 illustrated in FIG. 5. Part A of FIG. 7 illustrates an example of the operation of the sensor 200 in the case where it is not determined that a collision is to occur in collision determination. Further, part B of FIG. 7 illustrates an example of the operation of the sensor 200 in the case where it is determined that a collision is to occur in collision determination.

As illustrated in part A of FIG. 7, in the case where it is not determined that a collision is to occur in collision determination, the sensor 200 outputs image data to the data bus B1. Further, as illustrated in part B of FIG. 7, in the case where it is determined that a collision is to occur in collision determination, the sensor 200 does not output image data to the data bus B1.

Each of the plurality of sensors 200 of the transmission system 1000 selectively outputs image data to the data bus B1 depending on a result of collision determination as illustrated in FIG. 7. Thus, in the transmission system 1000, even if "a setting error of an amount of delay occurs due to a bug in software that the processor 100 executes, and the plurality of sensors 200 undesirably outputs image data at overlapped timings," an image data collision on the data bus B1 does not occur.

Figure 8:
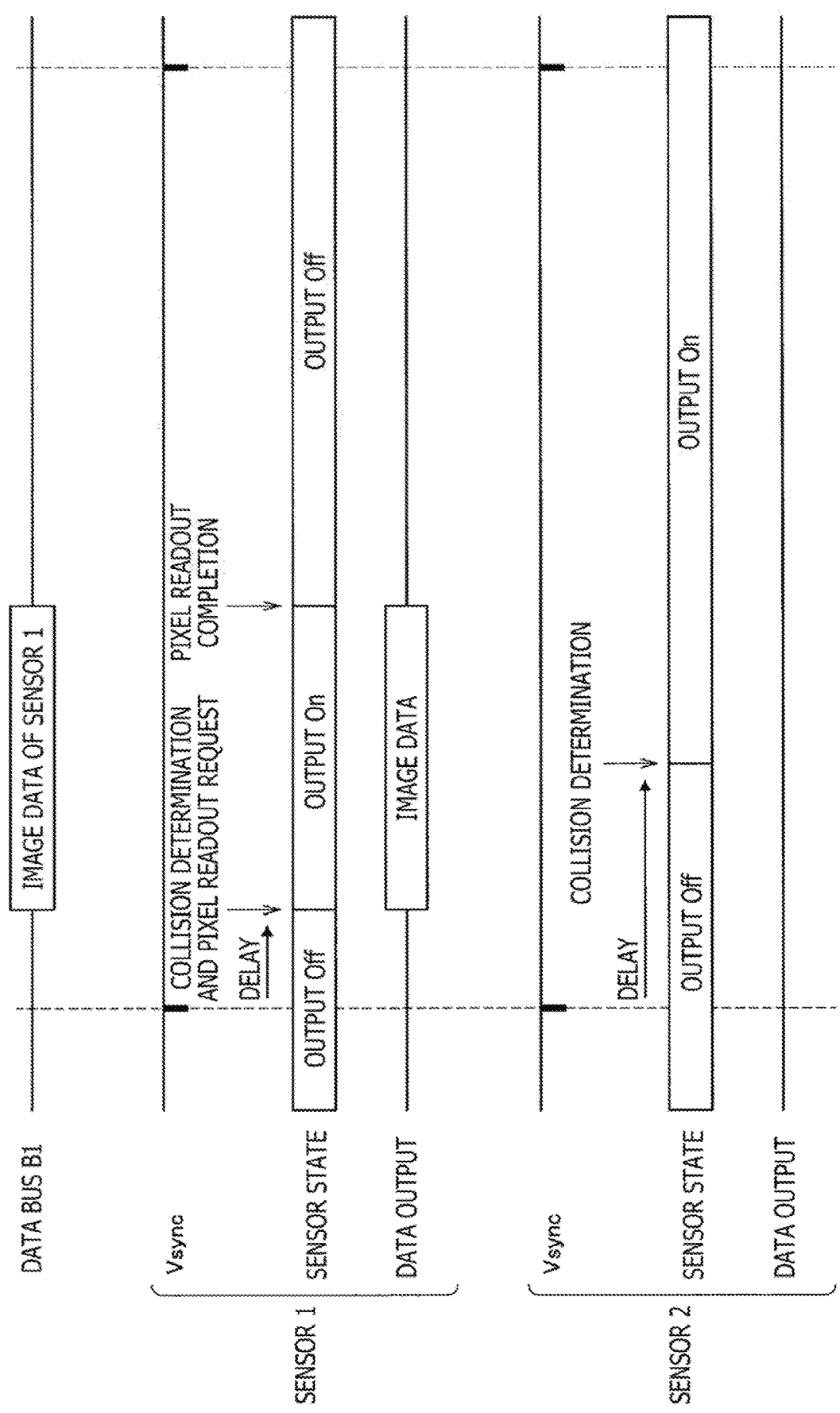
FIG. 8 is an explanatory diagram illustrating an example of image data transmission in the transmission system according to the present embodiment.

FIG. 8 is an explanatory diagram illustrating an example of image data transmission in the transmission system 1000 according to the present embodiment. FIG. 8 illustrates, like FIG. 4, an example of image data transmission in the case where the plurality of sensors 200 outputs image data at overlapped timings. FIG. 8 illustrates an example of image data transmission in a case where the transmission system 1000 includes the two image sensors represented by the sensor 1 and the sensor 2.

As illustrated in FIG. 8, each of the sensor 200 represented by the sensor 1 and the sensor 200 represented by the sensor 2 performs collision determination, and then selectively outputs image data to the data bus B1. In the example illustrated in FIG. 8, the sensor 200 represented by the sensor 2 does not outputs image data to the data bus B1, so that an occurrence of an image data collision on the data bus B1 is prevented.

Note that the example of image data transmission in the transmission system 1000 is not limited to the example illustrated in FIG. 8. In the case where the plurality of sensors 200 outputs image data at timings not overlapped with each other, for example, image data is transmitted in the transmission system 1000 in a manner similar to that of FIG. 3.

[2-3-2] Configuration of Sensor 200

Figure 9:
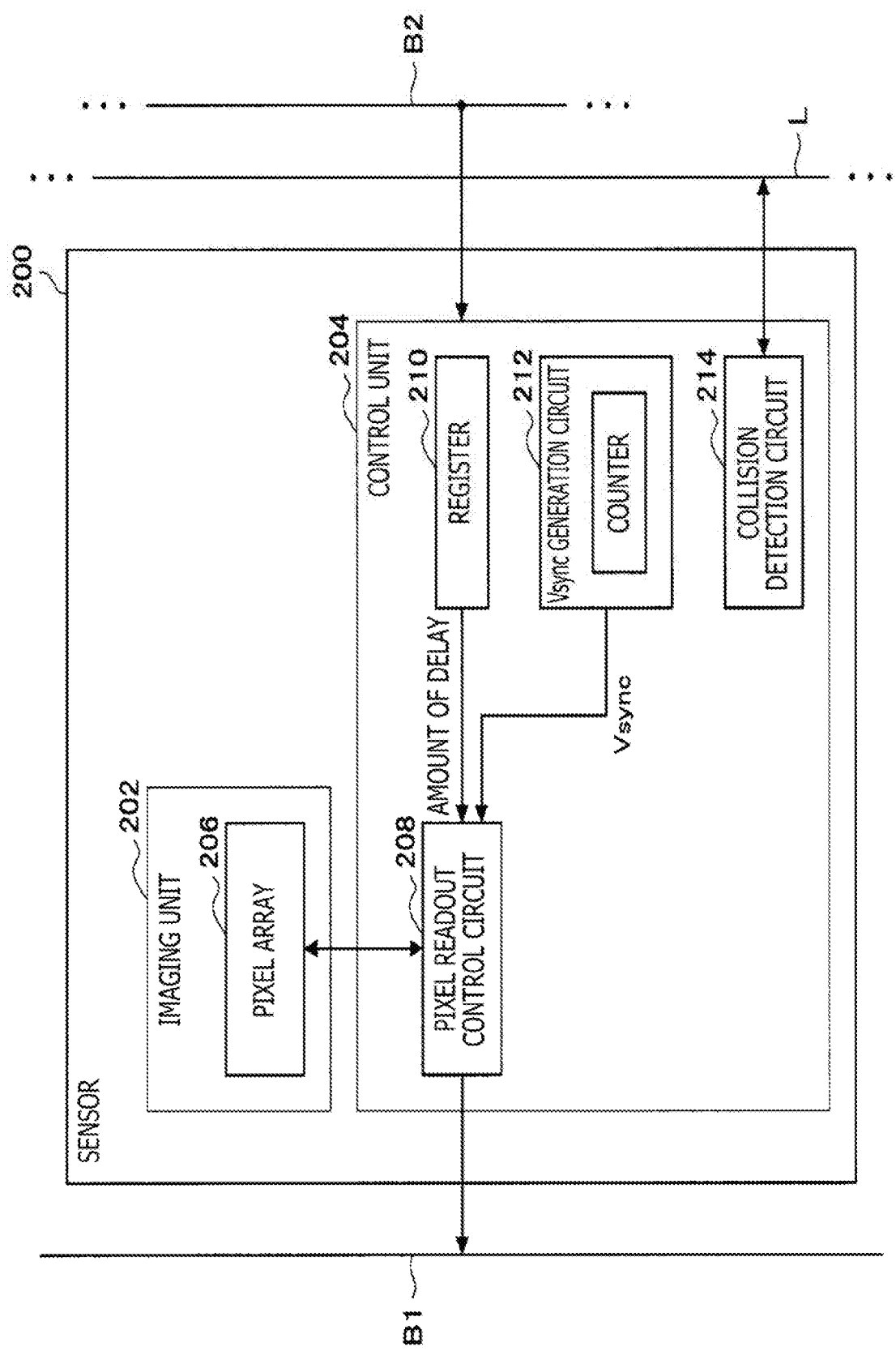
FIG. 9 is a block diagram illustrating an example of a configuration of the sensor (image sensor) according to the present embodiment.

Next, an example of a configuration of the sensor 200 is described. FIG. 9 is a block diagram illustrating an example of the configuration of the sensor 200 (image sensor) according to the present embodiment.

The sensor 200 includes, for example, an imaging unit 202 and a control unit 204. The sensor 200 is driven with electric power that is supplied from an internal power supply (not illustrated) of the transmission system 1000, such as a battery, or electric power that is supplied from a power supply external to the transmission system 1000.

The imaging unit 202 performs imaging. The imaging unit 202 includes, for example, a pixel array 206. Further, the imaging unit 202 includes an optical system (not illustrated) including optical elements such as a mirror and one or two or more lenses including an objective lens, a zoom lens, and a focus lens, for example.

The pixel array 206 includes, for example, imaging elements that correspond to pixels and are arranged in a matrix. To each of the imaging elements, a pixel circuit including a switching element such as an FET (Field Effect Transistor) is connected, and operation of this pixel circuit is controlled by the control unit 204 (more specifically, a pixel readout control circuit 208 described later, for example). Examples of the imaging element include a CMOS (Complementary Metal Oxide Semiconductor) and a CCD (Charge Coupled Device).

The control unit 204 plays a role of controlling the operation of the sensor 200. The processing of the control unit 204 is executed mainly by one or two or more processors (not illustrated) each including a computation circuit such as an MPU, for example.

Further, the control unit 204 includes, for example, the pixel readout control circuit 208, a register 210, a Vsync generation circuit 212, and a collision detection circuit 214.

The pixel readout control circuit 208 reads out, from each of the imaging elements of the pixel array 206, an image signal corresponding to imaging. The pixel readout control circuit 208 applies, to the pixel array 206, a control signal for controlling the operation of the pixel circuits of the pixel array 206, to thereby read out image signals.

More specifically, when the synchronization signal Vsync is sent from the Vsync generation circuit 212, the pixel readout control circuit 208 reads out an image signal from each of the imaging elements of the pixel array 206 after a period of time corresponding to an amount of delay indicated by setting information stored in the register 210 has elapsed.

The pixel readout control circuit 208 detects that the synchronization signal Vsync has been sent, for example, when the sync pulse (edge) of the synchronization signal Vsync is detected. Examples of the sync pulse of the synchronization signal Vsync include the falling edge of the synchronization signal Vsync and the rising edge of the synchronization signal Vsync. Note that the pixel readout control circuit 208 may detect a predetermined signal pattern, to thereby detect that the synchronization signal Vsync has been sent.

Further, the pixel readout control circuit 208 selectively outputs, on the basis of a result of collision determination based on the state of the collision detection line L detected by the collision detection circuit 214, image data corresponding to image signals read out from the pixel array 206 to the data bus B1.

Here, the processing related to collision determination based on the state of the collision detection line L may be performed by a processor (not illustrated) of the control unit 204 or by the pixel readout control circuit 208. Further, the processing related to collision determination based on the state of the collision detection line L may be performed by the collision detection circuit 214. That is, in the sensor 200, the processing related to collision determination based on the state of the collision detection line L may be performed by any component capable of performing the processing.

The register 210 is one recoding medium that the control unit 204 includes. The register 210 stores, for example, the setting information. The control unit 204 operates on the basis of the setting information stored in the register 210.

The Vsync generation circuit 212 includes, for example, a signal generator (not illustrated) configured to generate the synchronization signal Vsync and a counter. The Vsync generation circuit 212 takes generation timings of the synchronization signal Vsync with the use of the counter, for example, and generates the synchronization signal Vsync at each of the generation timings. The Vsync generation circuit 212 takes generation timings of the synchronization signal Vsync on the basis of an image size indicated by the setting information stored in the register 210, for example.

The collision detection circuit 214 detects the state of the collision detection line L. The collision detection circuit 214 includes, for example, the open drain circuit, and the sensor 200 is electrically connected to the collision detection line L by the open drain circuit. The state of the collision detection line L is detected through the open drain circuit.

FIG. 10 is an explanatory diagram illustrating an example of a configuration of the collision detection circuit 214 included in the sensor 200 (image sensor) according to the present embodiment. The collision detection circuit 214 includes, for example, a transistor Tr and a NOT circuit connected to a control terminal of the transistor Tr.

A first terminal of the transistor Tr is connected to the collision detection line L, and a second terminal of the transistor Tr is connected to a ground (reference potential point). In the example illustrated in FIG. 10, the transistor Tr is an N-channel FET, and the first terminal corresponds to an open drain terminal.

The sensor 200 outputs, through the open drain circuit, the voltage at the first level or the voltage at the second level to the collision detection line L.

The voltage at the second level is output through the open drain circuit by making the transistor Tr enter a conductive state (on state), for example. The sensor 200 outputs the voltage at the second level to the collision detection line L through the open drain circuit at least when image data is output.

A time at which image data is output according to the present embodiment corresponds to "a period from a time point at which it is not determined that a collision is to occur in collision determination to a time point at which output of image data is completed," for example.

Further, the voltage at the first level is output through the open drain circuit by making the transistor Tr enter a non-conductive state (off state), for example. The sensor 200 outputs the voltage at the first level to the collision detection line L at least after output of image data is completed, for example.

In the transmission system 1000, each of the plurality of sensors 200 is connected to the collision detection line L by the open drain terminal of the open drain circuit, and outputs the voltage at the first level or the voltage at the second level to the collision detection line L through the open drain circuit. Further, as described above, the collision detection line L is pulled up to the voltage at the first level by the pull-up circuit 300.

Thus, as described above, the state of the collision detection line L takes the wired-AND logic of a voltage level of a voltage that each of the plurality of sensors 200 outputs to the collision detection line L through the open drain circuit.

FIG. 11 is an explanatory diagram illustrating an example of the state of the collision detection line L in the transmission system 1000 according to the present embodiment. FIG. 11 illustrates "combinations of a voltage level of a voltage that one of the plurality of sensors 200 outputs to the collision detection line L and the state of the collision detection line L" as State 1, State 2, and State 3. In FIG. 11, "1" represents a value corresponding to the first level, and "0" represents a value corresponding to the second level.

As illustrated in FIG. 11, as the combinations of a voltage level of a voltage that one sensor 200 outputs to the collision detection line L and the state of the collision detection line L, there are the three combinations of State 1, State 2, and State 3.

Here, State 2 and State 3 illustrated in FIG. 11 are each a state in which any of the plurality of sensors 200 is outputting image data in the transmission system 1000. Further, State 1 illustrated in FIG. 11 is a state in which none of the plurality of sensors 200 is outputting image data.

Thus, the sensor 200 determines whether the state of the collision detection line L indicates "1," that is, determines whether the state of the collision detection line L is the first level, for example, thereby being capable of determining whether a collision is to occur.

Figure 12:
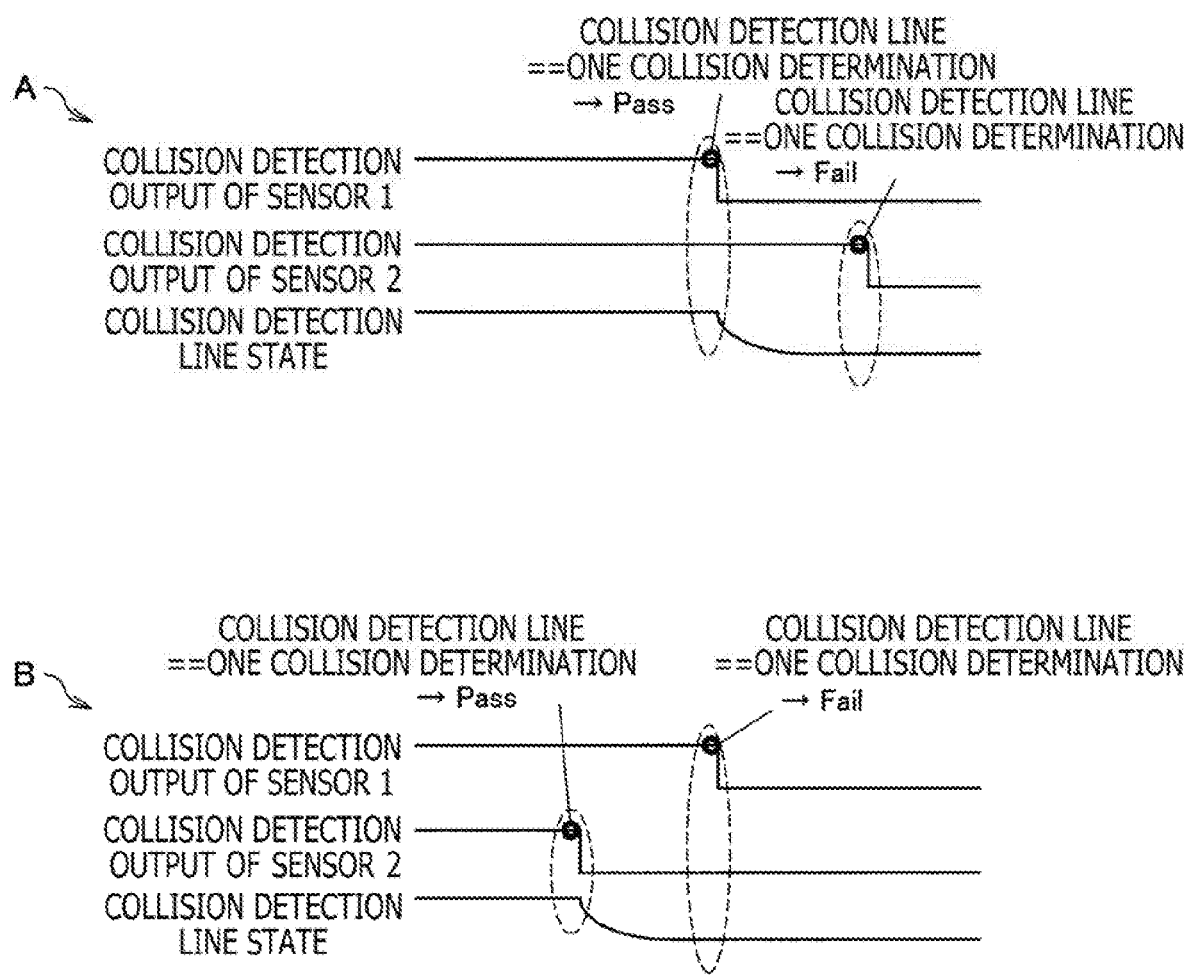
FIG. 12 is an explanatory diagram illustrating examples of voltages that sensors output to the collision detection line L and the state of the collision detection line L in the transmission system according to the present embodiment.

FIG. 12 is an explanatory diagram illustrating examples of voltages that the sensors 200 output to the collision detection line L and the state of the collision detection line L in the transmission system 1000 according to the present embodiment. FIG. 12 illustrates an example in the case where the transmission system 1000 includes the two image sensors represented by the sensor 1 and the sensor 2.

"COLLISION DETECTION OUTPUT" in FIG. 12 represents a level of a voltage that the sensor 200 outputs to the collision detection line L (the same holds true in other figures). Further, "COLLISION DETECTION LINE STATE" in FIG. 12 represents a change in voltage at the collision detection line L (the same holds true in other figures).

As illustrated in part A of FIG. 12 and part B of FIG. 12, the sensor 200 that performs collision determination first outputs the voltage at the second level to the collision detection line L, so that the state of the collision detection line L indicates the value corresponding to the second level. Thus, the sensor 200 that performs collision determination next determines whether the state of the collision detection line L is the first level, thereby being capable of determining whether a collision is to occur.

Note that the "collision detection system that determines whether the state of the collision detection line L is the first level to determine whether a collision is to occur" described above corresponds to the first collision detection system described later. That is, the collision detection system in the sensor 200 is not limited to the "collision detection system that determines whether the state of the collision detection line L is the first level to determine whether a collision is to occur" described above, as indicated in the second collision detection system described later.

The sensor 200 includes, for example, the configuration illustrated in FIG. 9. With the configuration illustrated in FIG. 9, for example, the sensor 200 selectively outputs image data to the data bus B1 on the basis of a result of collision determination based on the state of the collision detection line L.

Note that, needless to say, the configuration of the sensor 200 is not limited to the example illustrated in FIG. 9. Further, the function of the sensor 200, which is divided into two functional blocks, namely, the imaging unit 202 and the control unit 204 in the description with reference to FIG. 9, may be divided by any division method.

[2-3-3] Collision Detection System in Sensor 200

Next, the collision detection system applicable to the sensor 200 is more specifically described.

[2-3-3-1] Determination by First Collision Detection System

The sensor 200 determines whether the state of the collision detection line L is the first level, to thereby determine whether a collision is to occur. In the following description, determination by the first collision detection system is sometimes referred to as "first determination."

Note that, before performing determination, the sensor 200 may confirm that the voltage at the first level is being output to the collision detection line L, and perform determination in a case where it is confirmed that the voltage is being output. Further, in a case where it is not confirmed that the voltage is being output, the sensor 200 outputs the voltage at the first level to the collision detection line L, and then performs determination.

In a case where the determination by the first collision detection system is performed, the sensor 200 does not determine that a collision is to occur when the state of the collision detection line L is the first level. Further, in the case where the determination by the first collision detection system is performed, the sensor 200 determines that a collision is to occur when the state of the collision detection line L is the second level.

More specifically, the determination by the first collision detection system is performed through two steps of Step. 1 and Step. 2 described below.

(1) Step. 1

The sensor 200 determines whether the state of the collision detection line L is the first level. The sensor 200 determines that the state of the collision detection line L is the first level in a case where the state of the collision detection line L indicates "1."

In a case where it is determined that the state of the collision detection line L is the first level, the sensor 200 performs the processing in Step. 2 described below.

Further, in a case where it is not determined that the state of the collision detection line L is the first level, the sensor 200 determines that a collision is to occur and does not output image data.

(2) Step. 2

The sensor 200 outputs the voltage at the second level to the collision detection line L, and outputs image data to the data bus B1. Then, the sensor 200 outputs the voltage at the first level to the collision detection line L after output of the image data is completed.

FIG. 13 is an explanatory diagram illustrating an example of image data transmission in the transmission system 1000 according to the present embodiment. FIG. 13 illustrates an example of image data transmission in the case where the collision determination by the first collision detection system is performed. Further, FIG. 13 is an example of image data transmission in the case where the plurality of sensors 200 outputs image data at timings not overlapped with each other. FIG. 13 illustrates an example of image data transmission in the case where the transmission system 1000 includes the two image sensors represented by the sensor 1 and the sensor 2.

Each of the sensor 200 represented by the sensor 1 and the sensor 200 represented by the sensor 2 performs the above-mentioned processing in Step. 1 when the falling edge of the synchronization signal Vsync is detected and a period of time corresponding to an amount of delay indicated by the setting information has elapsed.

In the case where the plurality of sensors 200 outputs image data at timings not overlapped with each other, in the above-mentioned processing in Step. 1, it is determined that the state of the collision detection line L is the first level. Thus, the sensor 200 represented by the sensor 1 and the sensor 200 represented by the sensor 2 perform the above-mentioned processing in Step. 2 and output image data to the data bus B1 as illustrated in FIG. 13.

FIG. 14 is an explanatory diagram illustrating an example of image data transmission in the transmission system 1000 according to the present embodiment. FIG. 14 illustrates another example of image data transmission in the case where the collision determination by the first collision detection system is performed. Further, FIG. 14 is an example of image data transmission in the case where the plurality of sensors 200 outputs image data at overlapped timings. FIG. 14 illustrates, like FIG. 13, an example of image data transmission in the case where the transmission system 1000 includes the two image sensors represented by the sensor 1 and the sensor 2.

Each of the sensor 200 represented by the sensor 1 and the sensor 200 represented by the sensor 2 performs the above-mentioned processing in Step. 1 when the falling edge of the synchronization signal Vsync is detected and a period of time corresponding to an amount of delay indicated by the setting information has elapsed.

In the case where the plurality of sensors 200 outputs image data at overlapped timings, the sensor 200 that is represented by the sensor 1 and performs collision determination first determines that the state of the collision detection line L is the first level in the above-mentioned processing in Step. 1. Thus, the sensor 200 represented by the sensor 1 performs the above-mentioned processing in Step. 2 and outputs image data to the data bus B1 as illustrated in FIG. 14.

Further, in the case where the plurality of sensors 200 outputs image data at overlapped timings, the sensor 200 that is represented by the sensor 2 and performs collision determination next determines that the state of the collision detection line L is the second level in the above-mentioned processing in Step. 1. Thus, the sensor 200 represented by the sensor 2 does not output image data to the data bus B1 as illustrated in FIG. 14.

As illustrated in FIG. 13 and FIG. 14, for example, the sensor 200 performs the determination whether the state of the collision detection line L is the first level by the first collision detection system, thereby being capable of outputting image data to the data bus B1 after determining whether a collision is to occur.

Thus, in the transmission system 1000 including the sensors 200 each having a function of performing the determination by the first collision detection system, an occurrence of an image data collision on the data bus B1 shared by the plurality of sensors 200 can be prevented.

[2-3-3-2] Determination by Second Collision Detection System

Before performing the above-mentioned first determination (the determination by the first collision detection system), the sensor 200 further performs second determination by outputting a collision detection pattern to the collision detection line L to perform collision determination.

Here, the collision detection pattern according to the present embodiment is a voltage in a unique voltage pattern that the sensor 200 outputs to the collision detection line L. The collision detection pattern that is a unique voltage pattern is represented by a combination of the first level and the second level. The collision detection pattern is defined by the setting information, for example. The sensor 200 reads out the setting information from the register 210, to thereby specify a pattern length of the collision detection pattern and a combination of the first level and the second level.

The sensor 200 outputs the voltage at the first level and the voltage at the second level to the collision detection line L on the basis of a voltage pattern indicated by the setting information, to thereby output the collision detection pattern to the collision detection line L.

The sensor 200 performs voltage level switching based on the voltage pattern every time a set symbol period has elapsed, for example. The symbol period is a period that is required for output of one element of the collision detection pattern. The symbol period is defined by the setting information, for example. Further, in the transmission system 1000, the same symbol period is set to all of the sensors 200. In the following description, the symbol period is sometimes referred to as "symbol period t1" or "t1."

FIG. 15 is an explanatory diagram illustrating an example of the collision detection pattern according to the present embodiment. Part A of FIG. 15 illustrates an example of the collision detection pattern in a case where the maximum number of the sensors 200 of the transmission system 1000 is four. Further, part B of FIG. 15 illustrates an example of the collision detection pattern in a case where the maximum number of the sensors 200 of the transmission system 1000 is eight.

Note that the example of the collision detection pattern according to the present embodiment is not limited to the examples illustrated in FIG. 15. The transmission system 1000 can support any number of sensors 200 when the pattern length of the collision detection pattern is increased, for example. Now, as another example of the collision detection pattern, an example in which the transmission system 1000 includes the two sensors 200 represented by the sensor 1 and the sensor 2 is described.

When the collision detection pattern is output to the collision detection line L, the sensor 200 determines whether a collision is to occur on the basis of the state of the collision detection line L at the time of output of the collision detection pattern. The sensor 200 does not determine that a collision is to occur in a case where the state of the collision detection line L at the time of output of the collision detection pattern and a voltage level of the collision detection pattern are matched with each other. Further, the sensor 200 determines that a collision is to occur in a case where the state of the collision detection line L at the time of output of the collision detection pattern and the voltage level of the collision detection pattern are not matched with each other.

Then, in the case where it is not determined that a collision is to occur in the second determination, the sensor 200 performs the above-mentioned first determination (the determination by the first collision detection system). Further, in the case where it is determined that a collision is to occur in the second determination, the sensor 200 does not perform the above-mentioned first determination (the determination by the first collision detection system), and does not output image data to the data bus B1.

As described above, the sensor 200 performs the second determination before performing the above-mentioned first determination (the determination by the first collision detection system), and performs the above-mentioned first determination in the case where it is not determined that a collision is to occur in the second determination. Thus, it can be said that the second collision detection system is a collision detection system including the above-mentioned first collision detection system.

As described above, an occurrence of an image data collision on the data bus B1 can be prevented when the sensor 200 performs the determination by the first collision detection system. With the second collision detection system that includes the first collision detection system, an occurrence of an image data collision on the data bus B1 can thus be prevented similarly to the case where the determination by the first collision detection system is performed.

Here, the state of the collision detection line L is changed depending on a voltage that the sensor 200 outputs to the collision detection line L. Thus, the state of the collision detection line L is not changed immediately depending on a voltage that the sensor 200 outputs to the collision detection line L, and it takes a certain period of time until the state of the collision detection line L is changed. By way of example, when the state of the collision detection line L is the first level, in a case where one of the plurality of sensors 200 outputs the voltage at the second level to the collision detection line L, the state of the collision detection line L is not immediately changed to the second level. In the following description, a period of time required for the collision detection line L to change its state is sometimes referred to as "period t0" or "t0."

Thus, if the first determination is performed in the period t0, an erroneous determination is possibly made.

In the second collision detection system, the second determination is performed before the first determination corresponding to the first collision detection system, and hence, even if a timing at which the first determination is performed is within the period t0, an occurrence of an image data collision on the data bus B1 can be prevented by the second determination.

As a consequence, in the transmission system 1000 including the sensors 200 each having a function of performing the determination by the second collision detection system, an occurrence of an image data collision on the data bus B1 shared by the plurality of sensors 200 can be more positively prevented.

Figure 16:
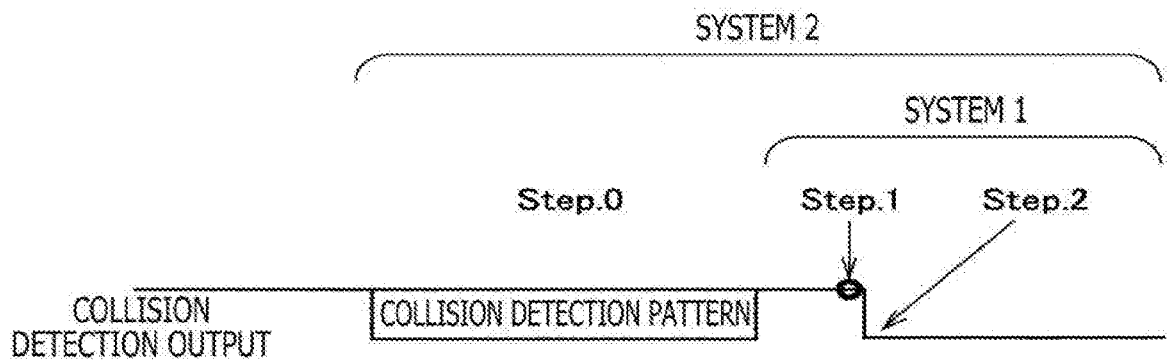
FIG. 16 is an explanatory diagram illustrating an outline of a second collision detection system that is applied to the sensor (image sensor) according to the present embodiment.

FIG. 16 is an explanatory diagram illustrating an outline of the second collision detection system that is applied to the sensor 200 (image sensor) according to the present embodiment.

The determination by the second collision detection system is performed through three steps including Step. 1 and Step. 2, which correspond to the first collision detection system, in addition to Step. 0.

Figure 17:
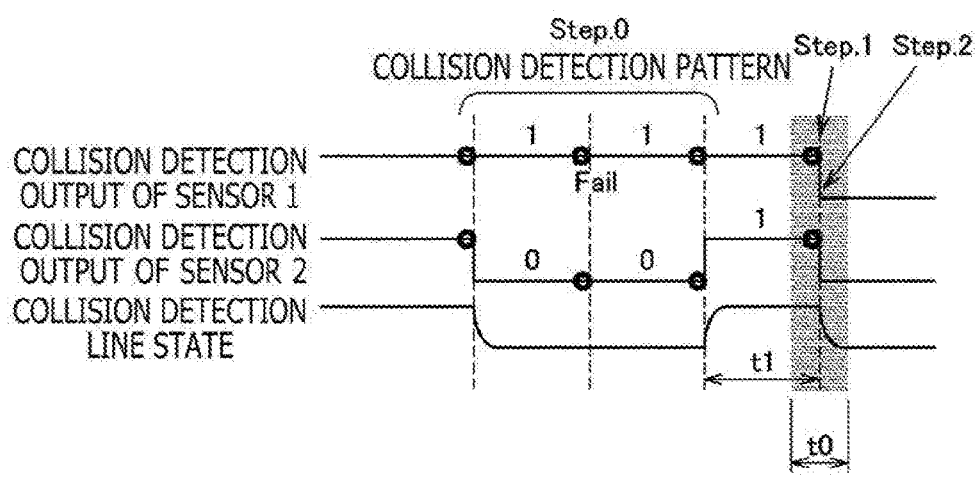
FIG. 17 is an explanatory diagram illustrating an example of collision determination by the second collision detection system in the sensor (image sensor) according to the present embodiment.

FIG. 17 is an explanatory diagram illustrating an example of the collision determination by the second collision detection system in the sensor 200 (image sensor) according to the present embodiment. FIG. 17 illustrates an example in which it is determined that a collision is to occur in the second determination.

Figure 18:
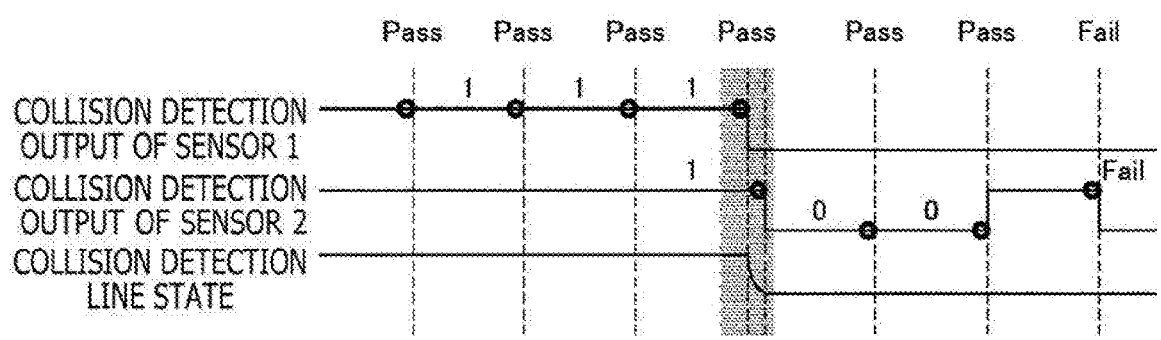
FIG. 18 is an explanatory diagram illustrating another example of the collision determination by the second collision detection system in the sensor (image sensor) according to the present embodiment.

Further, FIG. 18 is an explanatory diagram illustrating another example of the collision determination by the second collision detection system in the sensor 200 (image sensor) according to the present embodiment. FIG. 18 illustrates an example in which it is determined that a collision is to occur in the first determination. FIG. 17 and FIG. 18 each illustrate an example of the collision determination by the second collision detection system in the case where the transmission system 1000 includes the two image sensors represented by the sensor 1 and the sensor 2.

Now, with reference to the examples of FIG. 17 and FIG. 18, the collision determination by the second collision detection system is described.

(I) Step. 0

The sensor 200 outputs the collision detection pattern to the collision detection line L, and determines whether a collision is to occur on the basis of the state of the collision detection line L at the time of output of the collision detection pattern.

The sensor 200 outputs, to the collision detection line L, a voltage at a voltage level in accordance with the collision detection pattern in every symbol period t1 that is set.

The sensor 200 compares, in every symbol period t1, the voltage level of the voltage that is output in accordance with the collision detection pattern and the state of the collision detection line L with each other.

The sensor 200 determines that a collision is to occur in a case where the voltage level of the voltage that is output in accordance with the collision detection pattern and the state of the collision detection line L are not matched with each other. In the example illustrated in FIG. 17, as indicated by "Fail" in FIG. 17, the sensor 200 represented by the sensor 1 determines that a collision is to occur because the voltage level of the voltage that is output in accordance with the collision detection pattern and the state of the collision detection line L are not matched with each other.

Further, in a case where the voltage level of the voltage that is output in accordance with the collision detection pattern and the state of the collision detection line L are matched with each other, the sensor 200 repeatedly compares a voltage level of a voltage that is output in accordance with the collision detection pattern and the state of the collision detection line L with each other.

In a case where output of the collision detection pattern is ended, and voltage levels of all of voltages that are output in accordance with the collision detection pattern and the state of the collision detection line L are matched with each other, the processing in Step. 0 is completed. Further, when the processing in Step. 0 is completed, the sensor 200 performs the determination by the first collision detection system as described in Items (II) and (III) below.

(II) Step. 1

The sensor 200 determines, as in Item (1) above, whether the state of the collision detection line L is the first level.

In a case where it is determined that the state of the collision detection line L is the first level, the sensor 200 performs the processing in Step. 2. Further, in a case where it is not determined that the state of the collision detection line L is the first level, the sensor 200 determines that a collision is to occur and does not output image data. In the example illustrated in FIG. 18, as indicated by "Fail" in FIG. 18, the sensor 200 represented by the sensor 2 determines that a collision is to occur because it is not determined that the state of the collision detection line L is the first level.

(III) Step. 2

The sensor 200 outputs, as in Item (2) above, the voltage at the second level to the collision detection line L, and outputs image data to the data bus B1. Then, the sensor 200 outputs the voltage at the first level to the collision detection line L after output of the image data is completed.

Figure 19:
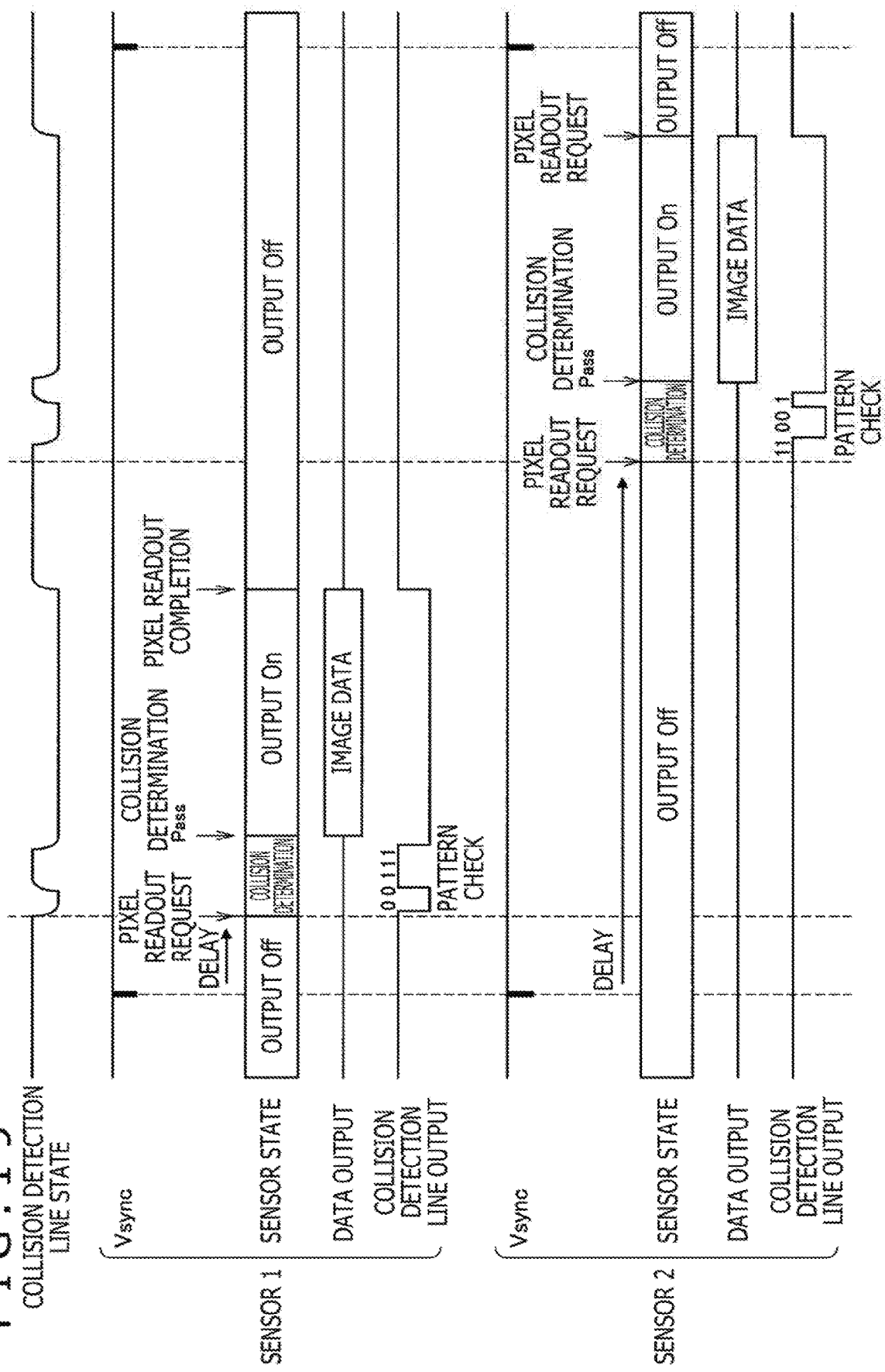
FIG. 19 is an explanatory diagram illustrating an example of image data transmission in the transmission system according to the present embodiment.

FIG. 19 is an explanatory diagram illustrating an example of image data transmission in the transmission system 1000 according to the present embodiment. FIG. 19 illustrates an example of image data transmission in a case where the collision determination by the second collision detection system is performed. Further, FIG. 19 is an example of image data transmission in the case where the plurality of sensors 200 outputs image data at timings not overlapped with each other. FIG. 19 illustrates an example of image data transmission in the case where the transmission system 1000 includes the two image sensors represented by the sensor 1 and the sensor 2.

Each of the sensor 200 represented by the sensor 1 and the sensor 200 represented by the sensor 2 performs the above-mentioned processing in Step. 0 when the falling edge of the synchronization signal Vsync is detected and a period of time corresponding to an amount of delay indicated by the setting information has elapsed.

In the case where the plurality of sensors 200 outputs image data at timings not overlapped with each other, in the above-mentioned processing in Step. 0, the voltage levels of all of the voltages that are output in accordance with the collision detection pattern and the state of the collision detection line L are matched with each other. Thus, each of the sensor 200 represented by the sensor 1 and the sensor 200 represented by the sensor 2 performs the above-mentioned processing in Step. 1.

Further, in the case where the plurality of sensors 200 outputs image data at timings not overlapped with each other, in the above-mentioned processing in Step. 1, it is determined that the state of the collision detection line L is the first level. Thus, each of the sensor 200 represented by the sensor 1 and the sensor 200 represented by the sensor 2 performs the above-mentioned processing in Step. 2 and outputs image data to the data bus B1 as illustrated in FIG. 19.

As illustrated in FIG. 19, for example, the sensor 200 performs the determination by the second collision detection system (the collision determination including the second determination in which the state of the collision detection line L is determined by utilizing the collision detection pattern and the first determination in which it is determined whether the state of the collision detection line L is the first level), thereby being capable of outputting image data to the data bus B1 after determining whether a collision is to occur.

Thus, in the transmission system 1000 including the sensors 200 each having the function of performing the determination by the second collision detection system, an occurrence of an image data collision on the data bus B1 shared by the plurality of sensors 200 can be prevented. Further, as described above, in the transmission system 1000 including the sensors 200 each having the function of performing the determination by the second collision detection system, an occurrence of an image data collision on the data bus B1 can be more positively prevented than in the transmission system 1000 including the sensors 200 each having the function of performing the determination by the first collision detection system.

Note that the determination method by the second collision detection system according to the present embodiment is not limited to the example described above.

Figure 20:
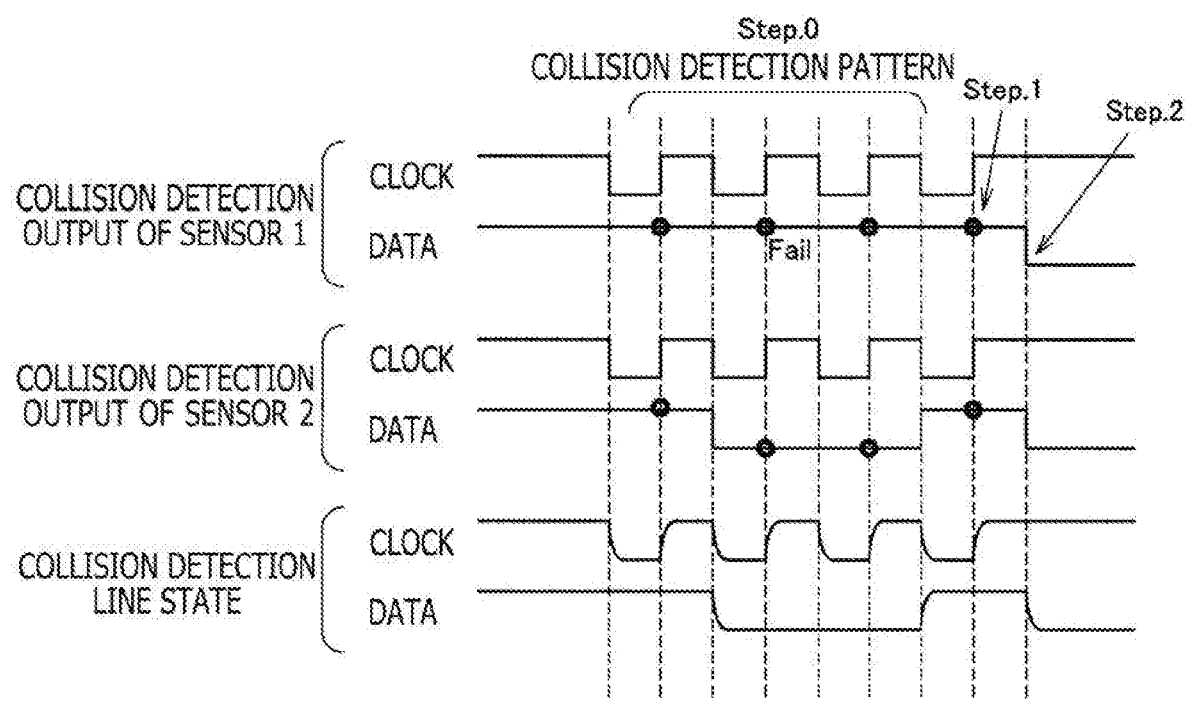
FIG. 20 is an explanatory diagram illustrating another example of the second collision detection system that is applied to the sensor (image sensor) according to the present embodiment.

FIG. 20 is an explanatory diagram illustrating another example of the second collision detection system that is applied to the sensor 200 (image sensor) according to the present embodiment. FIG. 20 is an example of the second collision detection system that is applicable in a case where the transmission system 1000 illustrated in FIG. 5 further includes a clock signal line (not illustrated) for supplying a clock signal to each of the plurality of sensors 200. The processor 100 outputs the above-mentioned clock signal to the clock signal line (not illustrated), for example. Further, for example, another component included in the transmission system 1000, such as a signal generator (not illustrated), may output the above-mentioned clock signal to the clock signal line (not illustrated).

In the example illustrated in FIG. 20, the sensor 200 compares a voltage level of a voltage that is output in accordance with the collision detection pattern and the state of the collision detection line L with each other at the rising edge of the clock signal, to thereby perform collision determination. Further, in the example illustrated in FIG. 20, the sensor 200 sets a value of a voltage that is output to the collision detection line L at the falling edge of the clock signal, and outputs a voltage corresponding to the set value to the collision detection line L.

Even in the case where the second collision detection system illustrated in FIG. 20 is used, for example, the sensor 200 can determine whether a collision is to occur, and then output image data to the data bus B1.

[2-4] Another Configuration Example of Transmission System According to Present Embodiment The transmission system according to the present embodiment includes the configuration illustrated in FIG. 5, for example. Note that the configuration of the transmission system according to the present embodiment is not limited to the example illustrated in FIG. 5.

As described with reference to FIG. 20, for example, the transmission system according to the present embodiment may further include, in addition to the configuration illustrated in FIG. 5, the clock signal line (not illustrated) for supplying a clock signal to each of the plurality of sensors 200.

Further, for example, the transmission system according to the present embodiment may not include the memory 400 illustrated in FIG. 5 in a case where images that are output from the plurality of sensors 200 are stored in a recoding medium external to the transmission system according to the present embodiment, or a case where images that are output from the plurality of sensors 200 are stored in a recoding medium included in the processor 100.

Further, the transmission system according to the present embodiment can take a configuration not including the display device 500 illustrated in FIG. 5.

Further, the transmission system according to the present embodiment may have any configuration suitable for the function of the above-mentioned electronic equipment to which the transmission system according to the present embodiment is applied.

[3] Example of Effect Provided by Transmission System According to Present Embodiment With the use of the transmission system according to the present embodiment, for example, the following effect is provided. Note that, needless to say, the effect provided by the transmission system according to the present embodiment is not limited to the following effect.

In a system including a plurality of image sensors that share a data bus, one collision detection line is provided, so that each of the image sensors checks the state of the collision detection line, and then outputs image data to the data bus, with the result that it is guaranteed that an occurrence of a collision of pieces of data output from the plurality of image sensors is prevented.

The preferred embodiment of the present disclosure is described in detail above with reference to the attached drawings, but the technical scope of the present disclosure is not limited to the example. It is apparent that various changes or modifications could be arrived at by persons who have ordinary knowledge in the technical field to which the present disclosure belongs within the scope of the technical idea described in the appended claims, and it is therefore understood that such changes or modifications naturally belong to the technical scope of the present disclosure.

Further, the effect described herein is merely illustrative and exemplary and is not limited. That is, the technique according to the present disclosure may provide other effects that are obvious for persons skilled in the art from the description of the present specification, in addition to the above-mentioned effect or instead of the above-mentioned effect.

Note that the following configurations also belong to the technical scope of the present disclosure.

(1) An image sensor that is connected to a data bus to which another image sensor is connected and image data is transmitted, and to a collision detection line to which the another image sensor is connected and which is pulled up to a voltage at a first level through a register, the image sensor determining, on the basis of a state of the collision detection line, whether a collision of pieces of the image data is to occur on the data bus when the image data is output, and then outputting the image data to the data bus.

(2) The image sensor according to Item (1), in which the collision detection line is electrically connected by an open drain circuit, and the state of the collision detection line is detected through the open drain circuit.

(3) The image sensor according to Item (2), in which the state of the collision detection line takes a wired-AND logic of a voltage level of a voltage that is output to the collision detection line through the open drain circuit, and a voltage level of a voltage that is output to the collision detection line from the another image sensor.

(4) The image sensor according to Item (2) or (3), in which when the image data is output, a voltage at a second level that is smaller than the voltage at the first level is output to the collision detection line through the open drain circuit.

(5) The image sensor according to any one of Items (1) to (4), including:

an imaging unit performing imaging; and a control unit controlling output of image data to the data bus, the image data indicating an image depending on imaging, in which the control unit determines whether the collision is to occur based on the state of the collision detection line, and allows the image sensor to output the image data in a case where it is not determined that the collision is to occur.

(6) The image sensor according to Item (5), in which the control unit does not allow the image sensor to output the image data in a case where it is determined that the collision is to occur.

(7) The image sensor according to Item (5) or (6), in which the control unit performs first determination in which whether the state of the collision detection line is the first level is determined to thereby determine whether the collision is to occur.

(8) The image sensor according to Item (7), in which in a case of performing the first determination, the control unit does not determine that the collision is to occur in a case where the state of the collision detection line is the first level, and determines that the collision is to occur in a case where the state of the collision detection line is a second level smaller than the first level.

(9) The image sensor according to Item (7) or (8), in which the control unit performs, before performing the first determination, second determination by outputting a voltage in a unique voltage pattern to the collision detection line to determine whether the collision is to occur on a basis of the state of the collision detection line at a time of output of the voltage in the unique voltage pattern, and performs the first determination in a case where it is not determined that the collision is to occur in the second determination.

(10) The image sensor according to Item (9), in which the control unit does not determine that the collision is to occur in a case where the state of the collision detection line at the time of output of the voltage in the unique voltage pattern and a voltage level of the unique voltage pattern are matched with each other, and determines that the collision is to occur in a case where the state of the collision detection line at the time of output of the voltage in the unique voltage pattern and the voltage level of the unique voltage pattern are not matched with each other.

(11) The image sensor according to any one of Items (5) to (10), in which the control unit outputs, when the image data is output, a voltage at a second level that is smaller than the voltage at the first level to the collision detection line, and outputs the voltage at the first level to the collision detection line after output of the image data is completed.

(12) A transmission system, including:

a plurality of image sensors each of which is connected to a data bus to which image data is transmitted, and a collision detection line that is pulled up to a voltage at a first level through a register;

a processing apparatus that is connected to the data bus; and a pull-up circuit that includes the register pulling up the collision detection line to the voltage at the first level, in which each of the plurality of image sensors determines, on the basis of a state of the collision detection line, whether a collision of pieces of the image data is to occur on the data bus when the image data is output, and then outputs the image data to the data bus.

REFERENCE SIGNS LIST 10, 100 Processor
20, 20A, 20B, 200, 200A, 200B Sensor
30, 400 Memory
40, 500 Display device
50, 1000 Transmission system
202 Imaging unit
204 Control unit
206 Pixel array
208 Pixel readout control circuit
210 Register
212 Vsync generation circuit
214 Collision detection circuit
300 Pull-up circuit
B1 Data bus
B2 Control bus
L Collision detection line

The invention claimed is:

1. An image sensor that is configured to be connected to a data bus to which another image sensor is connected and image data is transmitted, and that is configured to be connected to a collision detection line to which the another image sensor is connected and which is pulled up to a voltage at a first level through a register, the image sensor configured to determine, on a basis of a state of the collision detection line, whether a collision of pieces of the image data is to occur on the data bus when the image data is output, and then to output the image data to the data bus, the image sensor comprising:

an imager configured to perform imaging; and a controller configured to control output of image data to the data bus, the image data indicating an image depending on imaging, wherein the controller determines whether the collision is to occur based on the state of the collision detection line, allows the image sensor to output the image data in a case where it is not determined that the collision is to occur, performs first determination in which whether the state of the collision detection line is the first level is determined to thereby determine whether the collision is to occur performs, before performing the first determination, second determination by outputting a voltage in a unique voltage pattern to the collision detection line to determine whether the collision is to occur on a basis of the state of the collision detection line at a time of output of the voltage in the unique voltage pattern, and performs the first determination in a case where it is not determined that the collision is to occur in the second determination.

2. The image sensor according to claim 1, wherein
the collision detection line is electrically connected by an open drain circuit, and
the state of the collision detection line is detected through the open drain circuit.

3. The image sensor according to claim 2, wherein
the state of the collision detection line takes a wired-AND logic of a voltage level of a voltage that is output to the collision detection line through the open drain circuit, and a voltage level of a voltage that is output to the collision detection line from the another image sensor.

4. The image sensor according to claim 2, wherein
when the image data is output, a voltage at a second level that is smaller than the voltage at the first level is output to the collision detection line through the open drain circuit.

5. The image sensor according to claim 1, wherein
the controller does not allow the image sensor to output the image data in a case where it is determined that the collision is to occur.

6. The image sensor according to claim 1, wherein
in a case of performing the first determination,
the controller
does not determine that the collision is to occur in a case where the state of the collision detection line is the first level, and
determines that the collision is to occur in a case where the state of the collision detection line is a second level smaller than the first level.

7. The image sensor according to claim 1, wherein
the controller
does not determine that the collision is to occur in a case where the state of the collision detection line at the time of output of the voltage in the unique voltage pattern and a voltage level of the unique voltage pattern are matched with each other, and
determines that the collision is to occur in a case where the state of the collision detection line at the time of output of the voltage in the unique voltage pattern and the voltage level of the unique voltage pattern are not matched with each other.

8. The image sensor according to claim 1, wherein
the controller
outputs, when the image data is output, a voltage at a second level that is smaller than the voltage at the first level to the collision detection line, and
outputs the voltage at the first level to the collision detection line after output of the image data is completed.

9. A transmission system comprising:
a plurality of image sensors each of which is connected to a data bus to which image data is transmitted, and a collision detection line that is pulled up to a voltage at a first level through a register;
a processing apparatus that is connected to the data bus; and
a pull-up circuit that includes the register pulling up the collision detection line to the voltage at the first level,
wherein each of the plurality of image sensors determines, on a basis of a state of the collision detection line, whether a collision of pieces of the image data is to occur on the data bus when the image data is output, and then outputs the image data to the data bus, and
wherein each of the plurality of image sensors includes
an imager configured to perform imaging; and
a controller configured to control output of image data to the data bus, the image data indicating an image depending on imaging,
wherein the controller
determines whether the collision is to occur based on the state of the collision detection line, allows the image sensor to output the image data in a case where it is not determined that the collision is to occur,
performs first determination in which whether the state of the collision detection line is the first level is determined to thereby determine whether the collision is to occur
performs, before performing the first determination, second determination by outputting a voltage in a unique voltage pattern to the collision detection line to determine whether the collision is to occur on a basis of the state of the collision detection line at a time of output of the voltage in the unique voltage pattern, and
performs the first determination in a case where it is not determined that the collision is to occur in the second determination.

10. The transmission system according to claim 9, wherein
the collision detection line is electrically connected by an open drain circuit, and
the state of the collision detection line is detected through the open drain circuit.

11. The transmission system according to claim 10, wherein
the state of the collision detection line takes a wired-AND logic of a voltage level of a voltage that is output to the collision detection line through the open drain circuit, and a voltage level of a voltage that is output to the collision detection line from the another image sensor.

12. The transmission system according to claim 10, wherein
when the image data is output, a voltage at a second level that is smaller than the voltage at the first level is output to the collision detection line through the open drain circuit.

13. The transmission system according to claim 9, wherein
the controller does not allow the image sensor to output the image data in a case where it is determined that the collision is to occur.

14. The transmission system according to claim 9, wherein
in a case of performing the first determination,
the controller
does not determine that the collision is to occur in a case where the state of the collision detection line is the first level, and
determines that the collision is to occur in a case where the state of the collision detection line is a second level smaller than the first level.

15. The transmission system according to claim 9, wherein
the controller
does not determine that the collision is to occur in a case where the state of the collision detection line at the time of output of the voltage in the unique voltage pattern and a voltage level of the unique voltage pattern are matched with each other, and determines that the collision is to occur in a case where the state of the collision detection line at the time of output of the voltage in the unique voltage pattern and the voltage level of the unique voltage pattern are not matched with each other.

16. The transmission system according to claim 9, wherein the controller outputs, when the image data is output, a voltage at a second level that is smaller than the voltage at the first level to the collision detection line, and outputs the voltage at the first level to the collision detection line after output of the image data is completed.

* * * * *